United States Patent
Ikeda et al.

(10) Patent No.: US 10,976,812 B2
(45) Date of Patent: Apr. 13, 2021

(54) INFORMATION PROCESSING DEVICE AND INFORMATION PROCESSING METHOD

(71) Applicant: SONY CORPORATION, Tokyo (JP)

(72) Inventors: Takuya Ikeda, Tokyo (JP); Kentaro Ida, Tokyo (JP); Yousuke Kawana, Tokyo (JP); Osamu Shigeta, Chiba (JP); Seiji Suzuki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 49 days.

(21) Appl. No.: 15/752,916

(22) PCT Filed: Jun. 17, 2016

(86) PCT No.: PCT/JP2016/068086
§ 371 (c)(1),
(2) Date: Feb. 15, 2018

(87) PCT Pub. No.: WO2017/043145
PCT Pub. Date: Mar. 16, 2017

(65) Prior Publication Data
US 2019/0004599 A1    Jan. 3, 2019

(30) Foreign Application Priority Data

Sep. 7, 2015   (JP) .............................. JP2015-176102

(51) Int. Cl.
*G06F 3/01*      (2006.01)
*H04N 9/31*      (2006.01)
(Continued)

(52) U.S. Cl.
CPC ................ *G06F 3/013* (2013.01); *G06F 3/14* (2013.01); *G09G 5/00* (2013.01); *G09G 5/36* (2013.01);
(Continued)

(58) Field of Classification Search
CPC ......... G06F 3/013; G06F 3/14; H04N 9/3194; H04N 9/3185; G09G 5/00; G09G 5/36;
(Continued)

(56) References Cited

U.S. PATENT DOCUMENTS 9,588,408 B1 *   3/2017   Linnell ................ H04N 9/3188
9,746,752 B1 *   8/2017   Yuan ..................... H04N 13/25
(Continued)

FOREIGN PATENT DOCUMENTS

CN       103731621 A     4/2014
JP       2004-078121 A   3/2004
(Continued)

OTHER PUBLICATIONS

International Search Report and Written Opinion of PCT Application No. PCT/JP2016/068086, dated Aug. 23, 2016, 11 pages.

*Primary Examiner* — Jose R Soto Lopez
(74) *Attorney, Agent, or Firm* — Chip Law Group

(57) ABSTRACT

Provided is an information processing device including an image processing unit that performs geometric correction on a target image instructed to be displayed in a display region that displays an image. The geometric correction is performed on a basis of direction information indicating a direction of a user viewing the display region with respect to the display region.

18 Claims, 26 Drawing Sheets

(51) Int. Cl.
*G09G 5/00* (2006.01)
*G06F 3/14* (2006.01)
*G09G 5/36* (2006.01)
*G03B 21/14* (2006.01)

(52) U.S. Cl.
CPC ......... *H04N 9/3185* (2013.01); *H04N 9/3194* (2013.01); *G03B 21/14* (2013.01); *G09G 2320/0261* (2013.01); *G09G 2354/00* (2013.01)

(58) Field of Classification Search
CPC ....... G09G 2320/0261; G09G 2354/00; G03B 21/14
See application file for complete search history.

(56) References Cited

U.S. PATENT DOCUMENTS

| | | | |
|---|---|---|---|
| 9,746,901 B2* | 8/2017 | Ady | G06F 3/011 |
| 2008/0095468 A1* | 4/2008 | Klemmer | H04N 9/3194 |
| | | | 382/285 |
| 2009/0174658 A1* | 7/2009 | Blatchley | G06F 1/1601 |
| | | | 345/158 |
| 2011/0001762 A1* | 1/2011 | Li | G06K 9/3208 |
| | | | 345/649 |
| 2013/0321312 A1* | 12/2013 | Higashi | G06F 3/041 |
| | | | 345/173 |
| 2014/0098124 A1* | 4/2014 | Yoshimura | H04N 9/3185 |
| | | | 345/619 |
| 2015/0062542 A1* | 3/2015 | Appia | H04N 9/3194 |
| | | | 353/69 |
| 2015/0102995 A1* | 4/2015 | Shen | G06F 1/3231 |
| | | | 345/156 |
| 2015/0195479 A1* | 7/2015 | Sano | G03B 21/147 |
| | | | 348/745 |
| 2016/0198552 A1* | 7/2016 | Chen | H05B 47/19 |
| | | | 348/460 |
| 2016/0213148 A1* | 7/2016 | Choi | G03B 21/604 |
| 2016/0224122 A1* | 8/2016 | Dietz | G06F 3/147 |
| 2017/0023911 A1* | 1/2017 | Russell | G03H 1/0005 |
| 2017/0026612 A1* | 1/2017 | Rintel | H04N 9/3194 |
| 2017/0160626 A1* | 6/2017 | Muramatsu | G01S 17/894 |
| 2017/0329208 A1* | 11/2017 | Takahashi | G03B 21/12 |
| 2017/0351327 A1* | 12/2017 | Yasuda | G06F 3/038 |
| 2018/0007329 A1* | 1/2018 | Tanaka | G09G 3/001 |
| 2018/0018761 A1* | 1/2018 | Tanaka | G06T 3/60 |

FOREIGN PATENT DOCUMENTS

| | | |
|---|---|---|
| JP | 2005-176017 A | 6/2005 |
| JP | 2007-079210 A | 3/2007 |
| JP | 2011-248254 A | 12/2011 |
| JP | 2013-026824 A | 2/2013 |
| JP | 2013-246804 A | 12/2013 |
| JP | 2014-077862 A | 5/2014 |
| JP | 2014-078121 A | 5/2014 |
| JP | 2015-130555 A | 7/2015 |

* cited by examiner

FIG. 10

| DISPLAY TECHNIQUE | | CONTENT | USER STATE | | ENVIRONMENT STATE | | DISPLAY LOCATION (SIDE SURFACE or TOP SURFACE · FLOOR SURFACE or CURVED SURFACE) |
|---|---|---|---|---|---|---|---|
| STAGE | TECHNIQUE | | NUMBER OF PEOPLE | USER POSITION · VISUAL LINE DIRECTION AND PROJECTION SURFACE | RELATION BETWEEN PROJECTION DIRECTION OF IMAGE PROJECTION DEVICE AND USER VISUAL LINE DIRECTION | TOP AND BOTTOM PROBLEM | |
| STAGE 1 | · MOVEMENT | · CONTENT WITH NO FRONT, REAR, RIGHT, AND LEFT (STARRY SKY, PARTICLE ANIMATION, OR THE LIKE) | INDIVIDUAL PLURAL | | · PARALLEL AND SUFFICIENTLY SMALL DISTANCE | NO | FLAT WALL SURFACE |
| STAGE 2 | · MOVEMENT · IMAGE ROTATION | · CONTENT WITH NO FRONT, REAR, RIGHT, AND LEFT · PHOTO, MOVING IMAGE | INDIVIDUAL PLURAL | VISUAL LINE DIRECTION OF USER AND PROJECTION SURFACE ARE VERTICAL TO EACH OTHER | | YES | TOP SURFACE · FLOOR SURFACE |
| STAGE 3 | · MOVEMENT · IMAGE ROTATION · FACING CORRECTION | · CONTENT WITH NO FRONT, REAR, RIGHT, AND LEFT · TEXT INFORMATION, PHOTO, MOVING IMAGE | INDIVIDUAL PLURAL | | · NOT PARALLEL | YES | TOP SURFACE · FLOOR SURFACE SURFACE CONTAINING OBSTACLE |
| STAGE 4 | · MOVEMENT · IMAGE ROTATION · VIEWING DIRECTION CORRECTION | · CONTENT WITH NO FRONT, REAR, RIGHT, AND LEFT · TEXT INFORMATION, PHOTO, MOVING IMAGE · COMMUNICATION (VIDEO CONFERENCE OR THE LIKE) | · ONLY SPECIFIC INDIVIDUAL | VISUAL LINE DIRECTION OF USER AND PROJECTION SURFACE ARE NOT VERTICAL TO EACH OTHER (VIEWING OBLIQUELY TO PLANE) | | YES | |

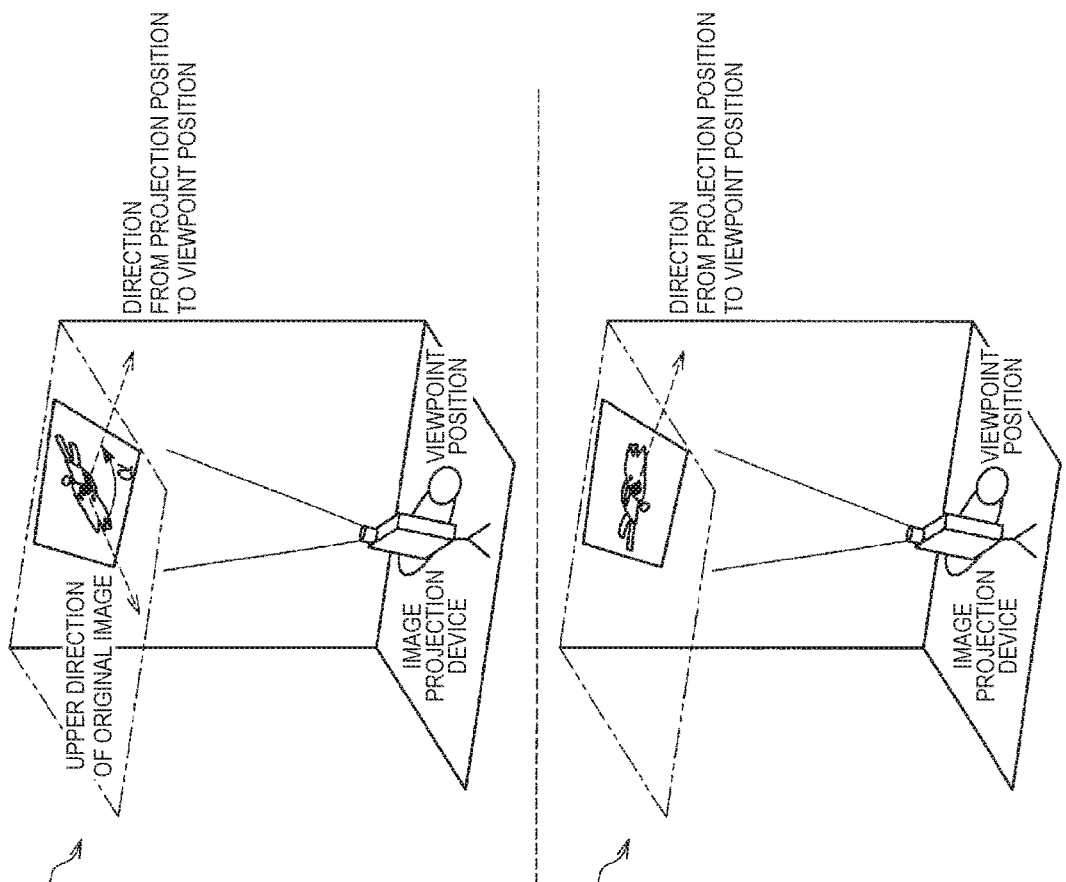
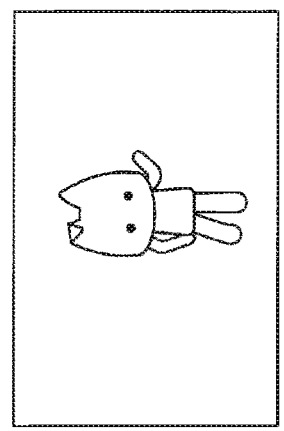
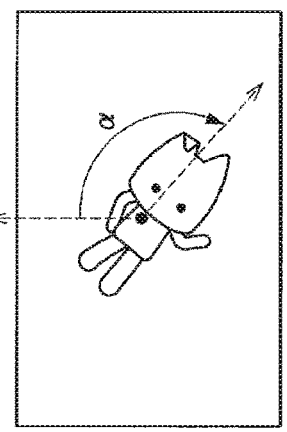

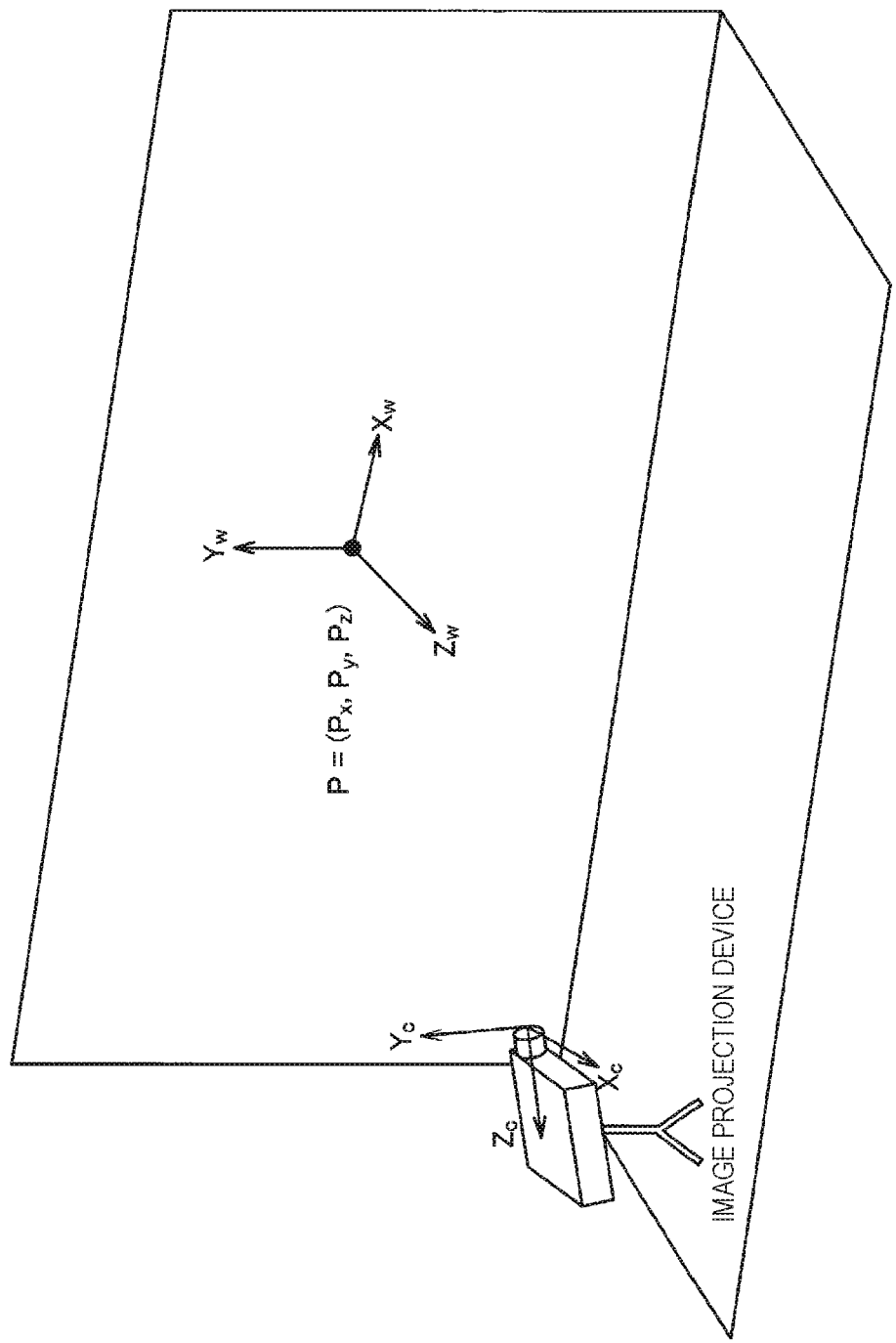

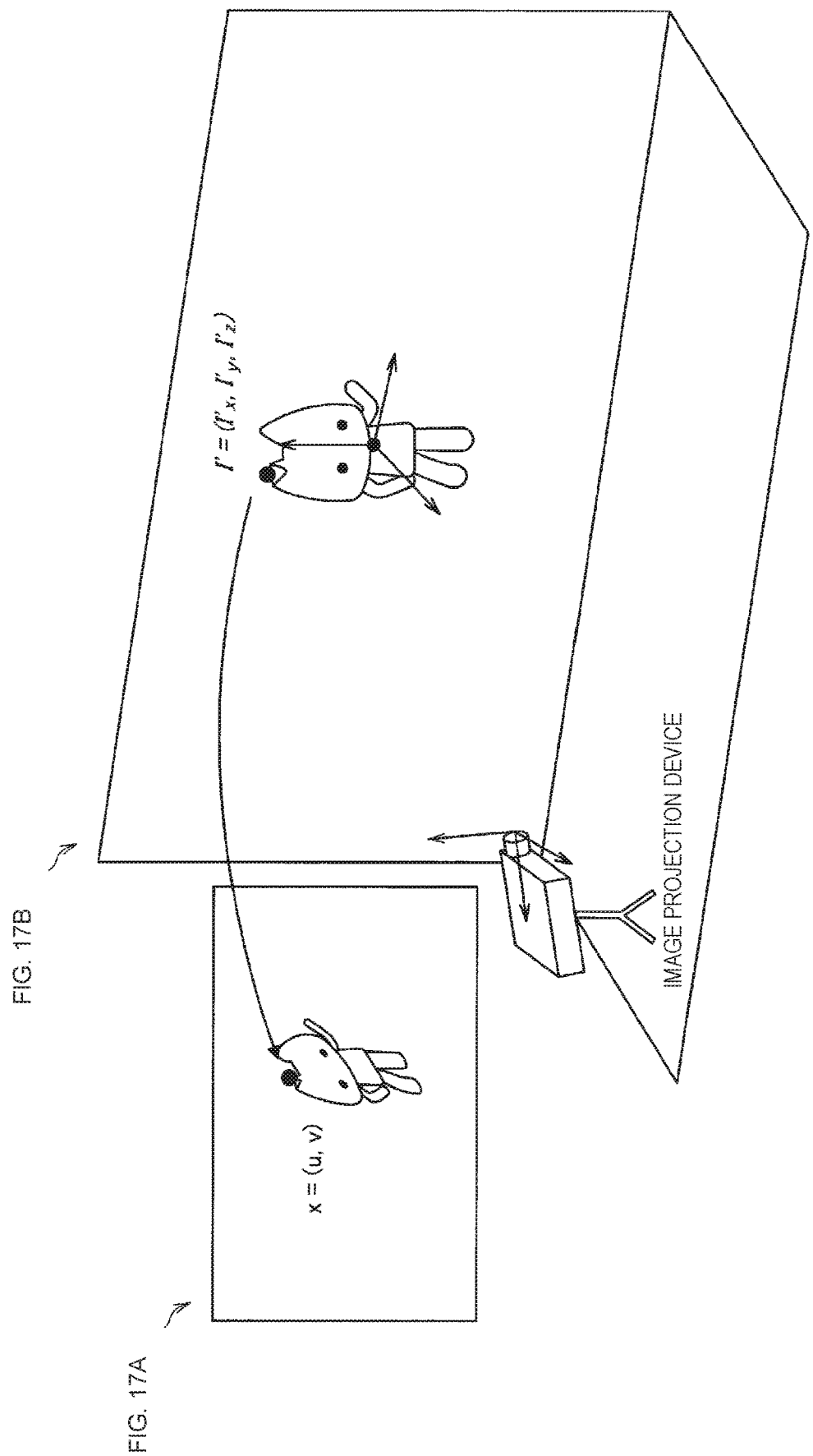

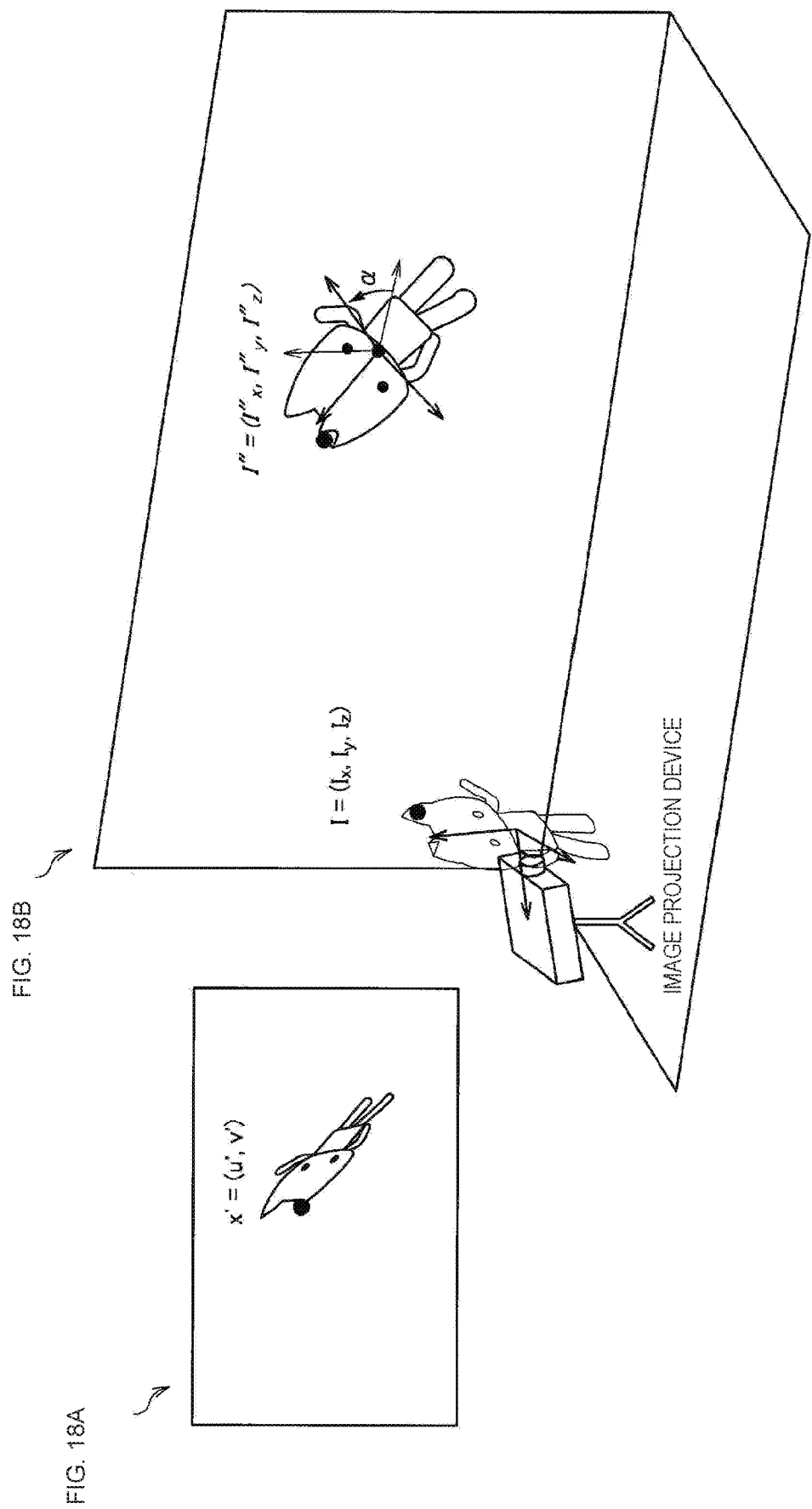

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2016/068086 filed on Jun. 17, 2016, which claims priority benefit of Japanese Patent Application No. JP 2015-176102 filed in the Japan Patent Office on Sep. 7, 2015. Each of the above-referenced applications is hereby incorporated herein by reference in its entirety.

TECHNICAL FIELD

The present disclosure relates to an information processing device, an information processing method, and a program.

BACKGROUND ART

Technologies for deciding projection positions to which images are projected on the basis of positions of viewers viewing the images and changing positions of projectors or projection directions of projectors on the basis of the decided projection positions have been developed. As such a technology, for example, a technology disclosed in Patent Literature 1 listed below can be exemplified.

CITATION LIST

Patent Literature

Patent Literature 1: JP 2007-079210A

DISCLOSURE OF INVENTION

Technical Problem

For example, in the technology disclosed in Patent Literature 1, a projection position corresponding to the detected position of a viewer is decided using projection position information in which a plurality of projection positions corresponding to positions of respective viewers are defined. However, in a case in which the technology disclosed in Patent Literature 1 is used, an image can be displayed so that a viewer can easily view the image only at a projection position defined in advance in the projection position information.

The present disclosure proposes a novel and improved information processing device, a novel and improved information processing method, and a novel and improved program capable of correcting an image displayed in a display region in accordance with a state of a user with regard to the display region.

Solution to Problem

According to the present disclosure, there is provided an information processing device including: an image processing unit configured to perform geometric correction on a target image instructed to be displayed in a display region capable of displaying an image, on a basis of direction information indicating a direction of a user viewing the display region with respect to the display region.

In addition, according to the present disclosure, there is provided an information processing method to be performed by an information processing device, the information processing method including: a step of performing geometric correction on a target image instructed to be displayed in a display region capable of displaying an image, on a basis of direction information indicating a direction of a user viewing the display region with respect to the display region.

In addition, according to the present disclosure, there is provided a program causing a computer to execute: a step of performing geometric correction on a target image instructed to be displayed in a display region capable of displaying an image, on a basis of direction information indicating a direction of a user viewing the display region with respect to the display region.

Advantageous Effects of Invention

According to the present disclosure, it is possible to correct an image displayed in a display region in accordance with a state of a user with regard to the display region.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 10 is an explanatory diagram illustrating an example of a process related to the information processing method according to the embodiment.

FIGS. 12A, 12B, 12C and 12D are explanatory diagrams illustrating an example of a process related to the information processing method according to the embodiment.

FIG. 15 is an explanatory diagram illustrating an example of a process related to the information processing method according to the embodiment.

FIGS. 17A and 17B are explanatory diagrams illustrating an example of a process related to the information processing method according to the embodiment.

FIGS. 18A and 18B are explanatory diagrams illustrating an example of a process related to the information processing method according to the embodiment.

MODE(S) FOR CARRYING OUT THE INVENTION

Figure 1A:
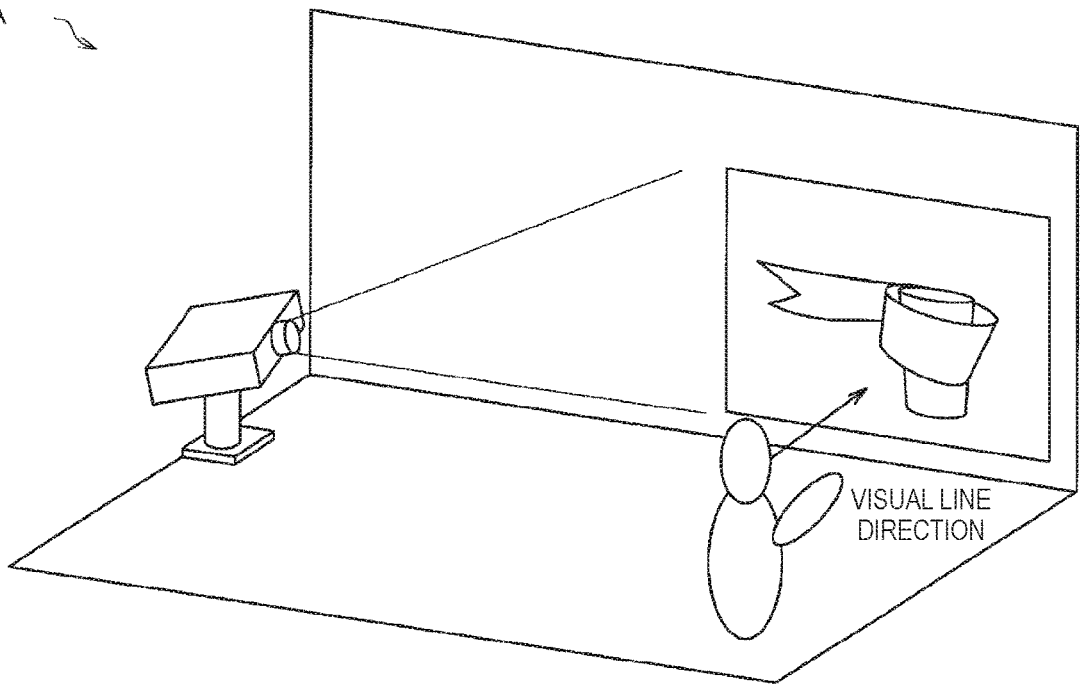
FIGS. 1A and 1B is are explanatory diagrams illustrating an overview of an information processing method according to an embodiment.

Hereinafter, (a) preferred embodiment(s) of the present disclosure will be described in detail with reference to the appended drawings. In this specification and the appended drawings, structural elements that have substantially the same function and structure are denoted with the same reference numerals, and repeated explanation of these structural elements is omitted.

Moreover, the description will be made below in the following order.
1. Information processing method according to embodiment
2. Information processing device according to embodiment
3. Program according to embodiment
(Information Processing Method According to Embodiment)

First, an information processing method according to an embodiment will be described. Hereinafter, the information processing method according to the embodiment will be described exemplifying a case in which an information processing device according to the embodiment performs a process related to the information processing method according to the embodiment.

[1] Overview of Information Processing Method According to Embodiment

For example, a display environment in which an image (a still image or a moving image: the same applies below) can be displayed at any position at which an image can be displayed in a space such as on a wall, a ceiling, or a floor in a room is considered.

Here, as the display environment according to the embodiment, for example, an environment in which an image is displayed by causing one or two or more image projection devices (for example, projectors) to project the image, an environment in which an image is displayed by causing a display device installed on a wall, a ceiling, a floor, or the like to display the image, or an environment of a combination thereof can be exemplified. Hereinafter, a case in which the display environment according to the embodiment is an environment in which an image is displayed by causing one or two or more image projection devices to project the image will be exemplified mainly.

As a process related to the information processing method according to the embodiment, the information processing device according to the embodiment performs geometric correction on an image of a target instructed to be displayed in a display region, for example, on the basis of direction information indicating a direction of a user viewing the display region with respect to the display region (image processing).

Hereinafter, the image of the target instructed to be displayed in the display region is referred to as a "target image." As the target image according to the embodiment, for example, a still image or a moving image indicating any content can be exemplified. Moreover, the target image according to the embodiment may be an image indicating a screen related to a user interface (UI).

Here, the display region according to the embodiment is a region in which an image can be displayed in a space of a display environment (hereinafter simply referred to as a "space" in some cases). Moreover, the display region according to the embodiment refers to, for example, a region which does not indicate either of an entire screen (a wall, a ceiling, or the like) or an entire projection region, but corresponds to an image instructed to be output in a displayable region. The display region according to the embodiment may be a region in which an image has already been displayed or may be a region in which an image will be displayed from now. As the display region according to the embodiment, for example, a region on one surface in a space of a display environment such as a wall, a ceiling, or a floor or a region across a plurality of surfaces can be exemplified. Hereinafter, a case in which the display region according to the embodiment is a region on one surface in a space of a display environment will be mainly exemplified.

As the display region according to the embodiment, a region set in advance can be exemplified.

Moreover, the display region according to the embodiment may be, for example, a region set on the basis of an attitude of a user or a visual line (for example, a visual line direction or a viewpoint position) of the user. The attitude or the visual line of the user is estimated on the basis of, for example, a captured image obtained through imaging by an imaging device that images a space of a display environment or a detection result of any sensor capable of detecting a motion, an attitude, or the like of the user, such as an acceleration sensor or an angular velocity sensor.

The display region according to the embodiment is set, for example, using a position at which a straight line extending in the visual line direction from the viewpoint position of the user viewing an image intersects a surface in the space of the display environment as a reference (hereinafter referred to as a "set reference position"). Moreover, as the display region set on the basis of the set reference position, for example, the following examples can be given. In addition, it is needless to say that examples of the display region set on the basis of the set reference position are not limited to the following examples:
- a region in which the set reference position is set as a set predetermined position of the display region, for example, the set reference position is set to a centroid position of the display region; and
- a region to which a region at the time of setting the set reference position as the predetermined position is translated so that the region is on one plane in a case in which the region is not on one plane at the time of setting the set reference position as the predetermined position (a case in which the display region is a region formed by one plane).

A display region setting process related to setting of the display region according to the embodiment may be performed in the information processing device according to the embodiment or may be performed in an external device of the information processing device according to the embodiment.

The direction information according to the embodiment is data indicating a direction of a user viewing the display region with respect to the display region. As will be described below, how the user views the display region can be specified (or estimated) using the direction information according to the embodiment. That is, the direction information according to the embodiment can be said to be information indicating a state of the user with regard to the display region.

As the direction information according to the embodiment, for example, information indicating a visual line direction of the user with regard to the display region or information indicating an attitude of the user with regard to the display region can be exemplified.

As the information indicating the visual line direction of the user with regard to the display region, for example, data indicating an angle between a normal direction of the display region and the visual line direction can be exemplified. In addition, the information indicating the visual line direction of the user with regard to the display region according to the embodiment is not limited to the foregoing information. For example, the information may be any data by which the visual line direction of the user with regard to the display region can be specified, such as data in which the visual line direction of the user is expressed in a vector format in a predetermined coordinate system of a space. Moreover, the information indicating the visual line direction of the user with regard to the display region may include, for example, data indicating the viewpoint position of the user.

Moreover, as the information indicating the attitude of the user with regard to the display region according to the embodiment, for example, data indicating an angle between the normal direction of the display region and a direction in which a predetermined part of the user, such as the face or the chest of the user, is facing can be exemplified. In addition, the information indicating the attitude of the user with regard to the display region according to the embodiment is not limited to the foregoing information. For example, the information may be any data by which a direction in which a predetermined part of the user is facing with regard to the display region can be specified, such as data in which the direction in which the predetermined part of the user is facing is expressed in a vector format in a predetermined coordinate system of a space. In addition, the information indicating the attitude according to the embodiment may include data indicating an attitude (for example, standing, sitting, or lying) of the user estimated on the basis of a sensing result or the like of a sensor capable of sensing a motion of the user, such as an acceleration sensor, or a captured image obtained by imaging a space of a display environment.

In addition, the direction information according to the embodiment is not limited to the information indicating the visual line direction of the user with regard to the display region or the information indicating the attitude of the user with respect to the display region, but may be any data by which a direction of the user viewing the display region with respect to the display region can be specified (or estimated).

Hereinafter, a case in which a direction of the user who is a subject viewing the display region with respect to the display region and which is indicated by the direction information according to the embodiment is a visual line direction of the user will be mainly exemplified. Moreover, hereinafter, the direction of the user who is a subject viewing the display region with respect to the display region and which is indicated by the direction information according to the embodiment is referred to as a "direction of the user indicated by the direction information" or a "direction of the user" in some cases.

The information processing device according to the embodiment generates, for example, the direction information by using any technology such as a method of using image processing on the basis of data indicating a sensing result acquired from various sensors. Moreover, for example, the information processing device according to the embodiment can also acquire direction information generated in an external device of the information processing device according to the embodiment through communication via a network (or direct communication) with the external device.

Moreover, as the geometric correction according to the embodiment, for example, a process of rotating a target image around a predetermined axis can be exemplified. As the rotation according to the embodiment, for example, rotation of the target image in one stage or a combination of rotation of the target image in two or more stages can be exemplified. Here, a change in the shape of a display region in which an image is displayed is realized by rotating a target image through the geometric correction according to the embodiment (more specifically, geometric correction of stage 3 or geometric correction of stage 4 to be described below) and distorting, for example, a tetragonal image with a predetermined aspect ratio such as 16:9 or 4:3. Moreover, the geometric correction according to the embodiment may include a process of translating an image. An example of the predetermined axis according to the embodiment will be described below.

Moreover, the geometric correction according to the embodiment may include a process of performing no geometric correction on a target image. In a case in which geometric correction is not performed on a target image, the target image is displayed in a display region without being corrected.

From another viewpoint of the geometric correction according to the embodiment, as the geometric correction according to the embodiment, for example, geometric correction in a first mode in which the target image is rotated so that an image displayed in the display region is tilted in the direction of the user indicated by the direction information and geometric correction in a second mode in which the first geometric correction is not performed can be exemplified. The geometric correction in the first mode corresponds to, for example, geometric correction of stage 4 to be described below. Moreover, the geometric correction in the second mode corresponds to, for example, one or two or more geometric corrections among geometric correction of stage 1 to geometric correction of stage 3 to be described below.

The information processing device according to the embodiment switches the first and second modes on the basis of one or both of, for example, the "target image" and a "state of the user viewing the display region."

Here, as the switch between the first and second modes based on the target image, for example, switch of each mode based on content or a type of target image can be exemplified.

Moreover, as the switch between the first and second modes based on the state of the user, for example, switch of each mode based on the number of users viewing the display region and switch of each mode based on a relation between the direction of the user indicated by the direction information and the display region can be exemplified. The switch of each mode based on the number of users viewing the display region is, for example, switch of each mode in a case in which the number of users viewing the display region is one and switch of each mode in a case in which the number of users viewing the display region is two or more.

An example of the geometric correction according to the embodiment will be described below.

Figure 1B:
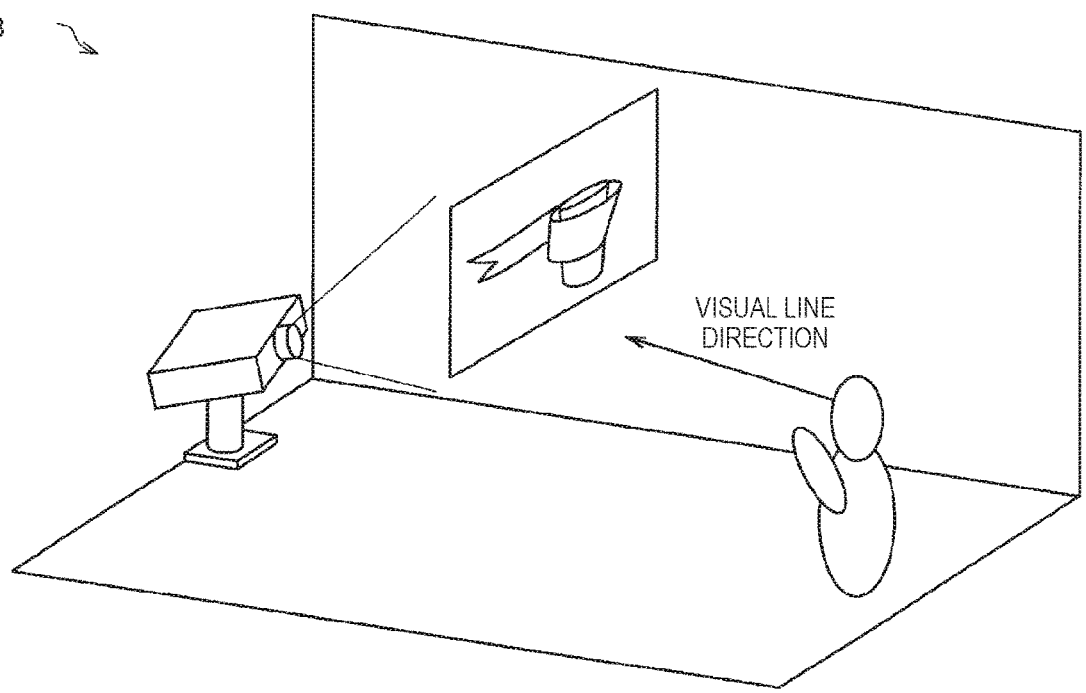

FIGS. 1A and 1B are explanatory diagrams illustrating an overview of the information processing method according to the embodiment. FIG. 1A indicates an example in which the target image subjected to the geometric correction according to the embodiment is displayed in the display region and FIG. 1B indicates another example in which the target image subjected to the geometric correction according to the embodiment is displayed in the display region.

For example, as illustrated in A of FIG. 1A, in a case in which the user who is a subject viewing the display region faces the display region, an image with good visibility for the user can be displayed in the display region by performing the geometric correction on the target image so that the gravity direction matches the vertical direction of the image. Here, the case in which the user who is a subject viewing the display region faces the display region corresponds to, for example, a case in which a direction (corresponding to a visual line direction illustrated in FIGS. 1A and 1B) of the user indicated by the direction information matches (or substantially matches) the normal direction of the display region.

Moreover, for example, as illustrated in FIG. 1B, in a case in which the user who is a subject viewing the display region does not face the display region, an image with good visibility for the user can be displayed in the display region by performing the geometric correction on the target image so that the target image is tilted in the direction (corresponding to the visual line direction illustrated in FIGS. 1A and 1B) of the user indicated by the direction information.

For example, as illustrated in FIGS. 1A and 1B, how the user views the display region can be specified (or estimated) using the direction information according to the embodiment and the information processing device according to the embodiment changes content of the geometric correction to be performed on the target image on the basis of the direction of the user indicated by the direction information.

Moreover, FIGS. 1A and 1B illustrate an example in which the target image subjected to the geometric correction is displayed in a case in which the display region is set on a side surface of the space of the display environment such as a wall of a room and the image is displayed. However, as described above, the display region may be set on a surface such as an upper surface of the space such as a ceiling of the room instead of the side surface. Here, for example, in a case in which the display region is set on the upper surface of the space, a top and bottom problem (a problem related to where the top, bottom, right, and left of an image are displayed) may occur. However, the information processing device according to the embodiment can perform rotation (which is an example of the geometric correction) on the target image on the basis of the direction of the user indicated by the direction information, and thus it is possible to prevent the top and bottom problem from occurring.

Accordingly, the information processing device according to the embodiment can correct an image displayed in the display region in accordance with the state of the user with respect to the display region by performing the foregoing image processing according to the embodiment.

In addition, a process related to the information processing method according to the embodiment is not limited to the image processing according to the embodiment.

For example, as described above, the information processing device according to the embodiment can further perform a display region setting process related to the setting of the display region.

Moreover, the information processing device according to the embodiment may further perform a display control process of displaying the target image subjected to the geometric correction through the image processing according to the embodiment in the display region.

For example, in a case in which an image is displayed in the display region by projecting the image from an image projection device, the information processing device according to the embodiment controls the projection of the image from the image projection device. The information processing device according to the embodiment controls the projection of the image from the image projection device by causing the image projection device to transmit control data including a control command and image data indicating the target image subjected to the geometric correction via a communication unit (to be described below) or a connected external communication device, for example.

Moreover, the information processing device according to the embodiment controls an operation of a pan tilt mechanism included in a device including the pan tilt mechanism, for example, by causing the device including the pan tilt mechanism such as a platform on which the image projection device is mounted to transmit control data including a control command.

In a case in which the image is displayed in the display region by projecting the image from the image projection device, for example, the image projection device and the device including the pan tilt mechanism are controlled, as described above, so that the information processing device according to the embodiment can display the target image subjected to the geometric correction in the display region.

Moreover, for example, in a case in which an image is displayed in the display region by displaying the image from a display device, the information processing device according to the embodiment controls the display of the image from the display device. For example, the information processing device according to the embodiment controls the display of the image from the display device by causing the display device to transmit control data including a control command and image data indicating the target image subjected to the geometric correction via a communication unit (to be described below) or a connected external communication device.

In a case in which the image is displayed in the display region by displaying the image from the display device, for example, the information processing device according to the embodiment controls the display of the image from the display device, and thus the information processing device according to the embodiment displays the target image subjected to the geometric correction in the display region.

Hereinafter, the process related to the information processing method according to the embodiment will be described more specifically.

[2] Process Related to Information Processing Method According to Embodiment

[2-1] Example of Display Environment According to Embodiment

Figure 2:
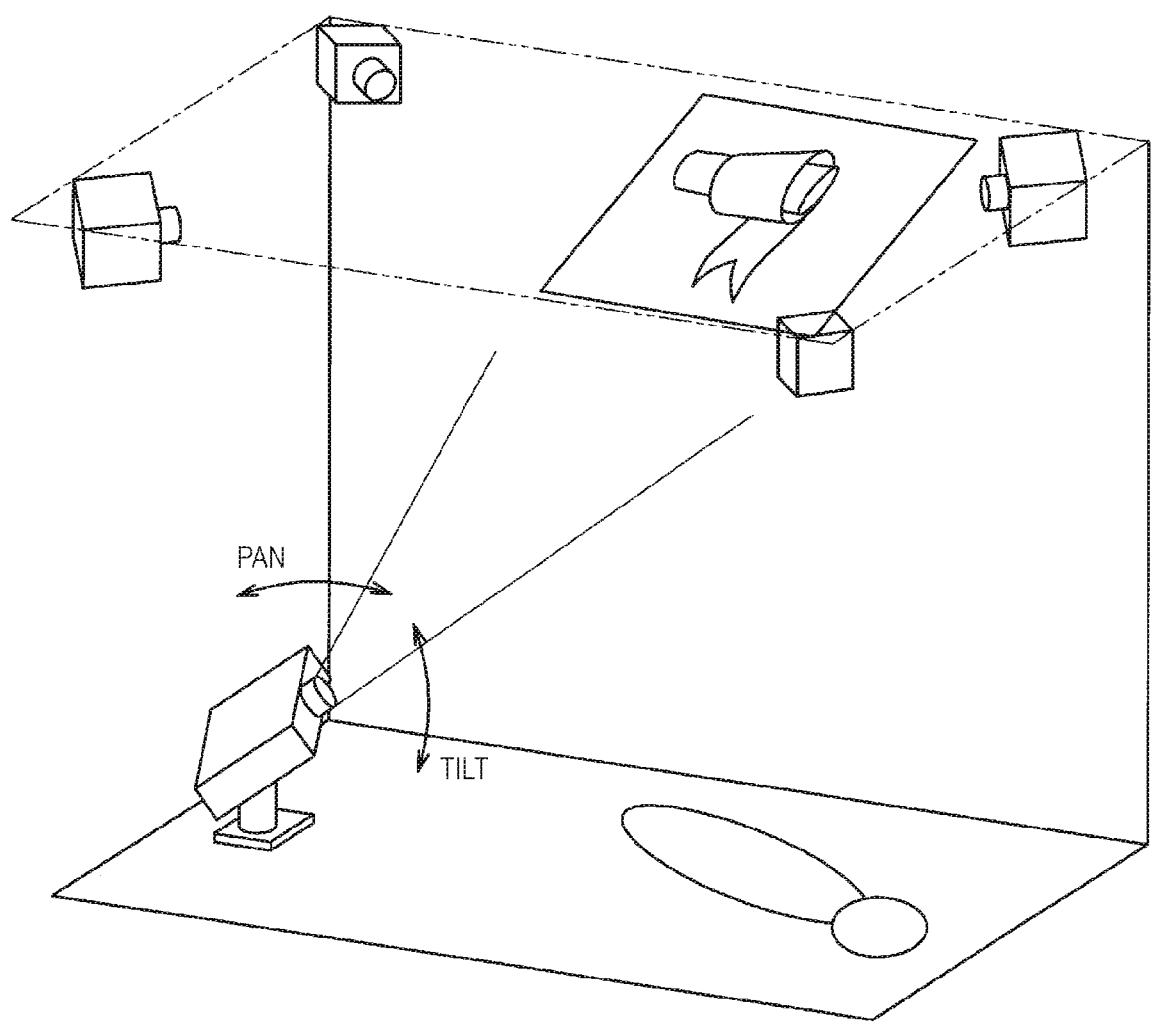
FIG. 2 is an explanatory diagram illustrating an example of a process related to the information processing method according to the embodiment.

FIG. 2 is an explanatory diagram illustrating an example of a process related to the information processing method according to the embodiment. FIG. 2 illustrates a room as an example of the display environment according to the embodiment.

As the display environment according to the embodiment, for example, as illustrated in FIG. 2, an environment in which imaging devices are installed in four corners of an indoor ceiling and an image projection device is installed on a platform including a pan tilt mechanism which can be driven in a pan direction and a tilt direction on an indoor floor can be exemplified. Moreover, although not illustrated in FIG. 2, a depth sensor capable of obtaining indoor 3-dimensional information in accordance with a detection result setting a projection direction of the image projection device as a detection direction is installed on the platform.

For example, in the display environment illustrated in FIG. 2, the information processing device according to the embodiment uses a position and an attitude of the user and a visual line direction of the user estimated on the basis of a captured image acquired from each of the imaging devices to perform a process. Here, one or both of a process related to the estimation of the visual line direction of the user based on the captured images and a process related to the estimation of the position and the attitude of the user based on the captured images may be performed in the information processing device according to the embodiment or may be performed in an external device of the information processing device according to the embodiment, such as a server. The external device such as a server is connected to the information processing device according to the embodiment through, for example, communication via any network such as the Internet (or direct communication in conformity with any communication scheme). In a case in which the processes related to the foregoing various kinds of estimation are performed in the external device of the information processing device according to the embodiment, the information processing device according to the embodiment uses information indicating estimation results to perform a process.

In addition, the estimation of the visual line direction of the user based on a captured image can be performed using, for example, any technology capable of estimating the visual line direction of the user from the captured images, such as a method of detecting the face or eyes of the user from the captured images. For example, the visual line direction of the user is estimated by analyzing a captured image in which the face or eyeballs of the user are imaged and estimating a direction of the face or the direction of the pupils. Moreover, the visual line direction of the user may also be estimated using corneal light reflex.

Moreover, the estimation of the position and the attitude of the user based on a captured image can be performed using, for example, any technology capable of estimating the position and the attitude of the user from the captured image, such as a method of detecting a part of the user from the captured image or a method of using data such as an installation position or an angle of view of the imaging device.

Moreover, a visual line direction of the user is not limited to the visual line direction estimated on the basis of a captured image. For example, a direction binding the position of the display region and the position of the user may be estimated as the visual line direction of the user on the basis of information indicating the position of the display region and information indicating the position of the user. As the information indicating the position of the display region, for example, information indicating the position of a screen or a position at which an image is displayed (projected) can be exemplified. Moreover, as the information indicating the position of the user, for example, information indicating the position of the user estimated on the basis of a captured image can be exemplified.

Moreover, for example, in the display environment illustrated in FIG. 2, the information processing device according to the embodiment can use 3-dimensional information (for example, data indicating a 3-dimensional point group) acquired from, for example, the depth sensor, for a process. Here, for example, the 3-dimensional information is used to calculate a plane equation corresponding to the display region.

In the display environment illustrated in FIG. 2, the information processing device according to the embodiment may be installed indoors or may be installed outdoors. In a case in which the information processing device according to the embodiment is installed indoors, the information processing device according to the embodiment can be installed at any location, for example, can be installed on a platform.

In addition, the display environment according to the embodiment is not limited to the example illustrated in FIG. 2.

For example, FIG. 2 illustrates the example in which the visual line direction of the user and the position and the attitude of the user are detected from images captured by the imaging devices installed in four corners of the indoor ceiling, but sensors such as a gyro sensor and an acceleration sensor may be combined to detect the position and the attitude of the user. Moreover, for example, the visual line direction of the user may be detected on the basis of an image captured by an imaging device mounted on a wearable device (for example, a head-mounted display or glasses) mounted on the user.

Moreover, for example, FIG. 2 illustrates the example in which the 3-dimensional information can be obtained using the depth sensor, but 3-dimensional information may also be obtained using any scheme capable of acquiring depth information. As the scheme capable of acquiring the depth information, for example, a scheme in which a stereo depth camera is used, a time of flight (TOF) scheme, a scheme in which a laser range finder is used, a scheme in which distance measurement by ultrasonic waves is used, and a scheme in which an infrared (IR) laser pattern is projected can be exemplified.

Moreover, for example, depth sensors may be installed in four corners of an indoor ceiling.

Moreover, the 3-dimensional information can also be obtained using a technology called simultaneous localization and mapping (SLAM) in which a 3-dimensional environment is generated using captured images obtained from imaging devices installed in four corners of an indoor ceiling.

[2-2] Process Related to Information Processing Method According to Embodiment

Hereinafter, a process related to the information processing method according to the embodiment will be described mainly exemplifying the display environment illustrated in FIG. 2.

(1) Image Processing

The information processing device according to the embodiment performs the geometric correction on the target image on the basis of the direction information.

(1-1) Example of Geometric Correction According to Embodiment

As the geometric correction according to the embodiment, for example, geometric corrections of four stages to be described in the following (A) to (D) can be exemplified. In addition, a specific process at each stage will be described below.

Figure 3:
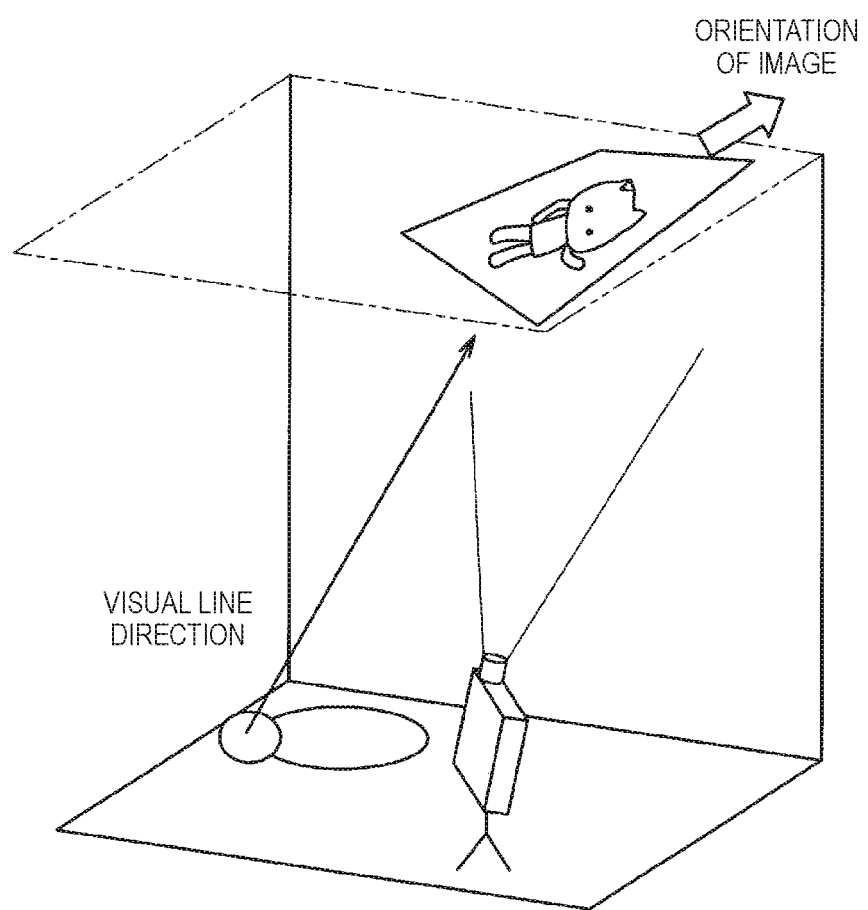
FIG. 3 is an explanatory diagram illustrating an example of a process related to the information processing method according to the embodiment.

(A) Stage 1: Geometric Correction in which Target Image is Displayed without being Corrected FIG. 3 is an explanatory diagram illustrating an example of a process related to the information processing method according to the embodiment. FIG. 3 illustrates an example of a case in which the target image related to the geometric correction of stage 1 is displayed in the display region.

In the geometric correction of stage 1, the information processing device according to the embodiment performs no geometric correction on the target image.

In a case in which the geometric correction of stage 1 is performed, the target image is displayed in the display region without being corrected.

Here, when the geometric correction of stage 1 is performed, the target image is displayed in the display region without correction. Therefore, as a case in which the geometric correction of stage 1 is applied, for example, a case in which the target image is an image indicating content which is not disrupted even without consideration of top and bottom can be exemplified.

Figure 4A:
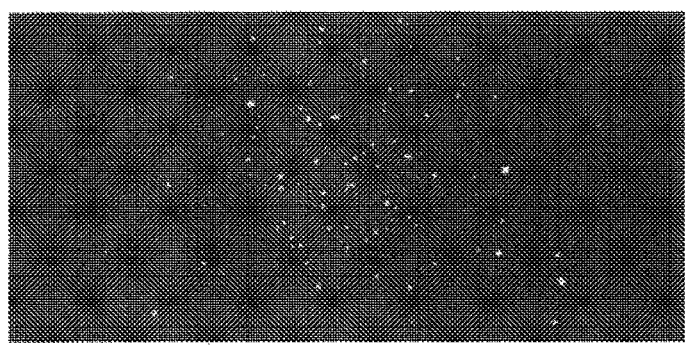
FIGS. 4A and 4B is are explanatory diagrams illustrating an example of a process related to the information processing method according to the embodiment.
Figure 4B:
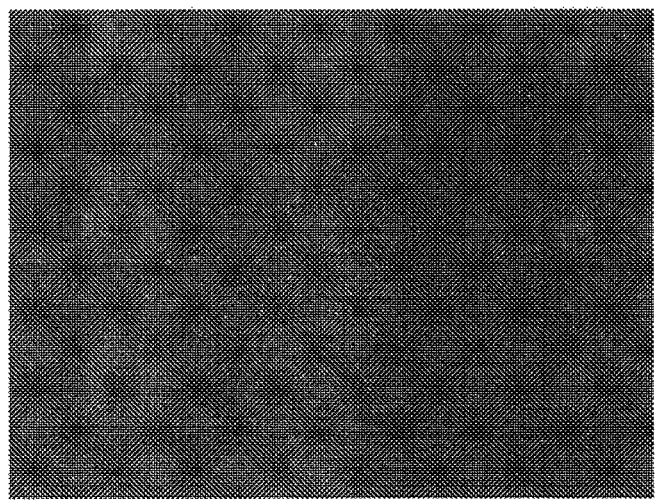

FIGS. 4A and 4B are explanatory diagrams illustrating an example of a process related to the information processing method according to the embodiment. FIG. 4A and FIG. 4B illustrate examples of images indicating content which is not disrupted even without consideration of top and bottom.

As the image indicating the content which is not disrupted even without consideration of top and bottom, for example, an image (FIG. 4A) such as starry sky or an image (FIG. 4B) indicating aurora or an animation in which small grains (particles) are used can be exemplified.

Accordingly, for example, the information processing device according to the embodiment may automatically perform the geometric correction of stage 1 in which no geometric correction is performed on the target image, on the basis of the target image.

Figure 5:
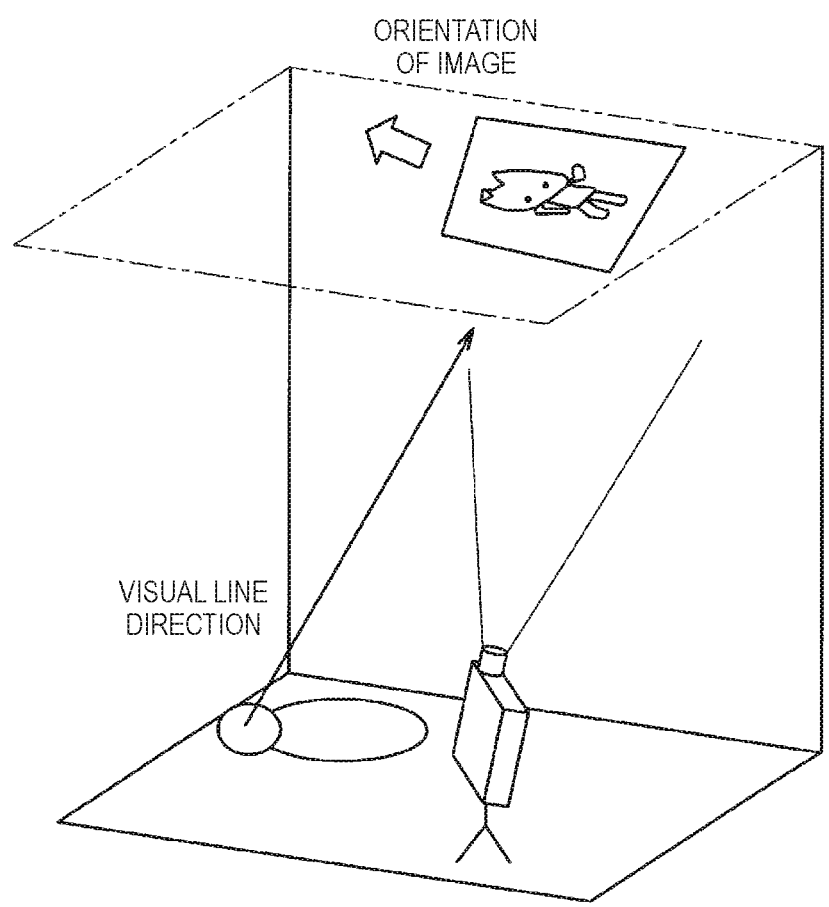
FIG. 5 is an explanatory diagram illustrating an example of a process related to the information processing method according to the embodiment.

(B) Stage 2: Geometric Correction in which Target Image is Rotated in Visual Line Direction of User and is Displayed FIG. 5 is an explanatory diagram illustrating an example of a process related to the information processing method according to the embodiment. FIG. 5 illustrates an example of a case in which the target image related to the geometric correction of stage 2 is displayed in the display region.

In the geometric correction of stage 2, the information processing device according to the embodiment performs a process of rotating an image in the visual line direction from the viewpoint position and the visual line direction of the user (a rotation process of one stage).

In a case in which the geometric correction of stage 2 is performed, for example, an image obtained by rotating the target image of stage 1 on the surface of the display region is displayed in the display region. Accordingly, in the case in which the geometric correction of stage 2 is performed, for example, a top and bottom problem can be prevented from occurring.

Here, in the geometric correction of stage 2, the size of an image displayed in the display region is larger in many cases than in a case in which the geometric correction of stage 3 or the geometric correction of stage 4 to be described below is performed (because the size of an image to be displayed in the display region can be smaller than the display region in a case in which the geometric correction of stage 3 or the geometric correction of stage 4 to be described below is performed).

Accordingly, the information processing device according to the embodiment may automatically perform the geometric correction of stage 2, for example, on the basis of a positional relation between the installation position of the image projection device and the display region in a case in which visibility is ensured by using the positional relation even when the geometric correction of stage 3 or the geometric correction of stage 4 to be described below is not performed.

Figure 6:
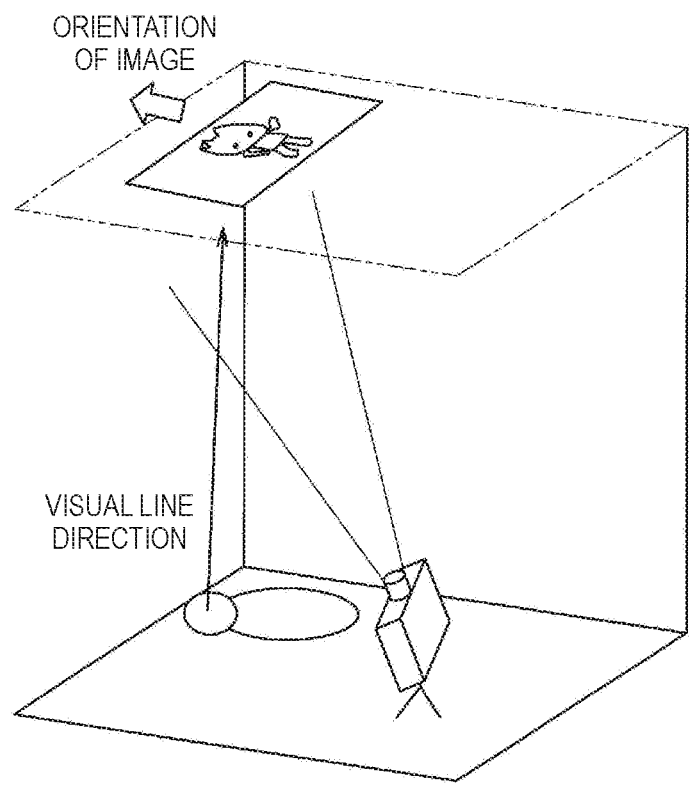
FIG. 6 is an explanatory diagram illustrating an example of a process related to the information processing method according to the embodiment.
Figure 7:
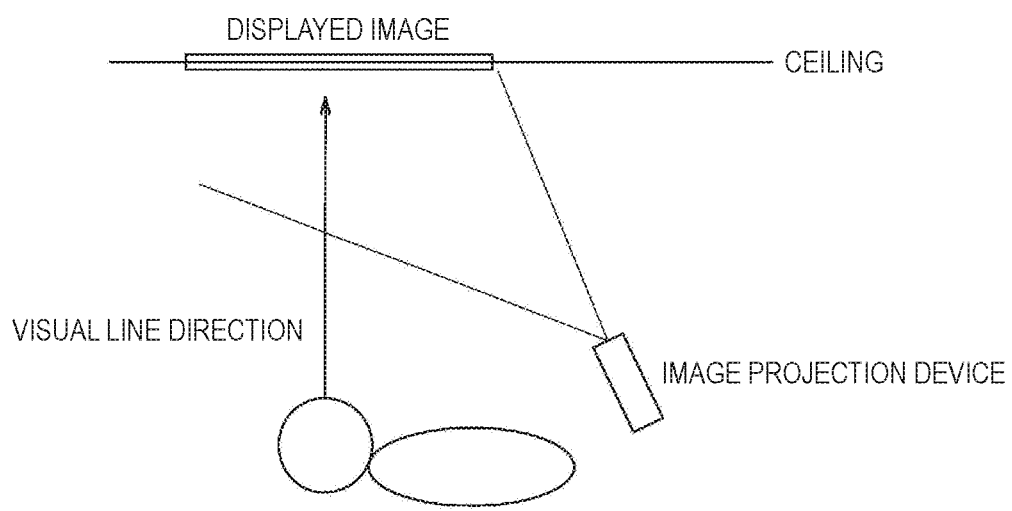
FIG. 7 is an explanatory diagram illustrating an example of a process related to the information processing method according to the embodiment.

(C) Stage 3: Geometric Correction in which Target Image is Aligned with Normal Direction of Display Region FIGS. 6 and 7 are explanatory diagrams illustrating an example of a process related to the information processing method according to the embodiment. FIGS. 6 and 7 each illustrate an example of a case in which the target image related to the geometric correction of stage 3 is displayed in the display region.

In the geometric correction of stage 3, the information processing device according to the embodiment corrects an image in consideration of a viewpoint position and a direction of the face of the user. The information processing device according to the embodiment calculates a plan equation corresponding to the display region on the basis of, for example, 3-dimensional information and estimates a plane corresponding to the display region. The information processing device according to the embodiment performs a process of rotating the target image in accordance with a normal direction of the estimated plane (hereinafter referred to as "facing correction" in some cases) by rotating the target image to follow the estimated plane and further rotating the target image in accordance with the orientation of the head of the user (a rotation process of two stages). In addition, an order of the processes in the geometric correction of stage 3 is not limited to the foregoing order. The information processing device according to the embodiment can perform the geometric correction of stage 3 in any processing order.

Figure 8:
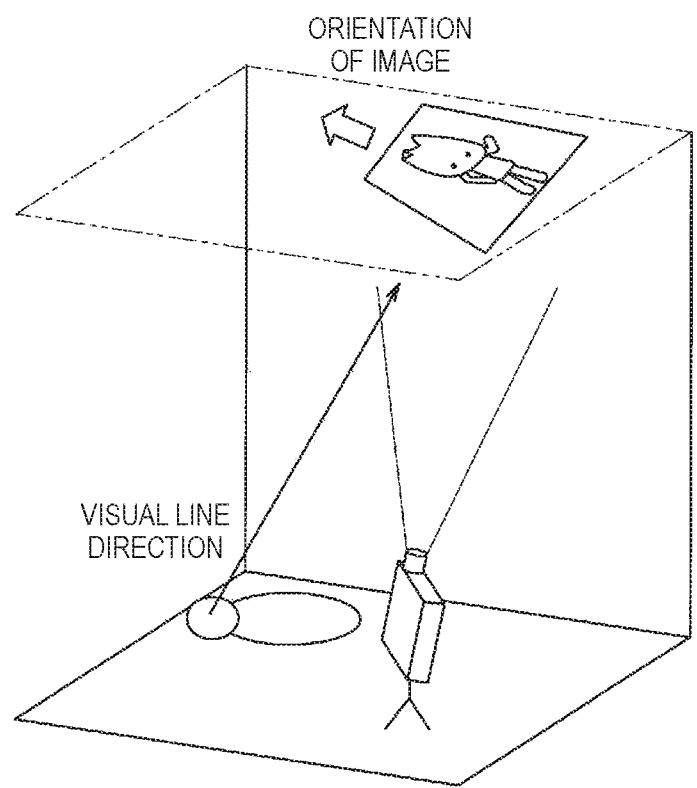
FIG. 8 is an explanatory diagram illustrating an example of a process related to the information processing method according to the embodiment.
Figure 9:
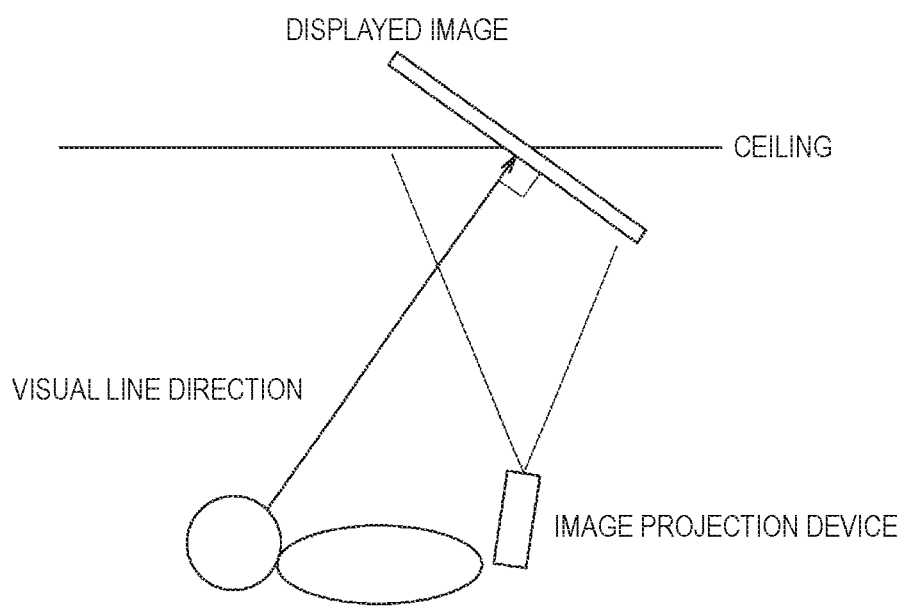
FIG. 9 is an explanatory diagram illustrating an example of a process related to the information processing method according to the embodiment.

In a case in which the geometric correction of stage 3 is performed, as illustrated in FIG. 7, for example, the target image is displayed in the display region as if a poster is attached to a plane. As illustrated in FIGS. 6 and 7, in a case in which the display region is set on the ceiling and the user lies on the floor, the user views the target image in a style in which the user views the image while lying on his/her back.
(D) Stage 4: Geometric Correction in which Target Image is Tilted and Displayed in Visual Line Direction of User FIGS. 8 and 9 are explanatory diagrams illustrating an example of a process related to the information processing method according to the embodiment. FIGS. 8 and 9 each illustrate an example of a case in which the target image related to the geometric correction of stage 4 is displayed in the display region.

The geometric correction of stage 4 is, for example, geometric correction performed to rotate the target image so that an image displayed in the display region is tilted in the direction of the user indicated by the direction information.

In the geometric correction of stage 4, the information processing device according to the embodiment further performs a process of rotating the target image in the visual line direction of the user (hereinafter referred to as "viewing direction correction") in addition to geometric correction similar to the geometric correction of stage 3 (a rotation process of three stages). The information processing device according to the embodiment performs, for example, a process of further rotating the target image subjected to the geometric correction of stage 3 in the visual line direction of the user as the geometric correction of stage 4. In addition, an order of the process of the geometric correction of stage 4 is not limited to the foregoing order. The information processing device according to the embodiment can perform the geometric correction of stage 4 in any processing order. Hereinafter, a case in which the information processing device according to the embodiment performs the process of further rotating the target image subjected to the geometric correction of stage 3 in the visual line direction of the user as the geometric correction of stage 4 will be exemplified.

In a case in which the geometric correction of stage 4 is performed, as illustrated in FIG. 9, for example, the target image tilted to be vertical to the visual line direction of the user is displayed in the display region. Here, the geometric correction of stage 4 is equivalent to, for example, geometric correction performed for the user to view the target image as if the target image is displayed on a virtual surface facing the user. In a case in which the display region is set on the ceiling and the user lies on the floor, as illustrated in FIGS. 8 and 9, the user can view the target image in a style in which a visual line is oriented obliquely upward.

As the geometric correction according to the embodiment, for example, the geometric corrections of four stages described in the foregoing (A) to (D) can be exemplified. In addition, the examples in which the display region is set on the ceiling have been described in FIGS. 3 to 9. However, even in a case in which the display region is set on a wall surface or the floor, the similar process can be applied.

In addition, the geometric correction according to the embodiment is not limited to the geometric corrections of four stages described in the foregoing (A) to (D).

For example, as described above, the geometric correction according to the embodiment may be geometric correction in a first mode corresponding to the geometric correction of stage 4 and geometric correction in a second mode in which the first geometric correction is not performed (for example, one or two or more geometric corrections among the geometric correction of stage 1 to the geometric correction of stage 3).

For example, in a case in which a user manipulation of designating content of the geometric correction is detected, the information processing device according to the embodiment performs geometric correction corresponding to the user manipulation on the target image.

Here, as the user manipulation according to the embodiment, for example, a manual manipulation such as pressing of a button for selecting a stage of the geometric correction, an utterance of a voice for selecting a stage of the geometric correction, and a gesture for selecting a stage of the geometric correction can be exemplified. For example, the manual manipulation for selecting a stage of the geometric correction is performed on any device such as a remote controller, a smartphone, or a tablet.

In a case in which the pressing of the button for selecting a stage of the geometric correction is performed as the user manipulation and, for example, a manipulation signal that includes stage identification information (for example, an ID indicating a stage of the geometric correction) indicating the stage of the geometric correction is acquired, the information processing device according to the embodiment performs the geometric correction of a stage indicated by the stage identification information.

Moreover, in a case in which the utterance of the voice for selecting a stage of the geometric correction is performed as the user manipulation, the information processing device according to the embodiment performs, for example, the geometric correction of a stage corresponding to a result of voice recognition. The voice recognition may be performed by the information processing device according to the embodiment or may be performed by an external device of the information processing device according to the embodiment.

Moreover, in a case in which the gesture for selecting a stage of the geometric correction is performed as the user manipulation, the information processing device according to the embodiment performs, for example, the geometric correction of a stage corresponding to a recognition result of the gesture. The gesture may be recognized by the information processing device according to the embodiment or may be performed by an external device of the information processing device according to the embodiment.

In a case in which the information processing device according to the embodiment performs the geometric correction corresponding to the user manipulation, the user can view the image subjected to desired geometric correction by performing a manipulation of selecting the stage of the geometric correction.

Moreover, the information processing device according to the embodiment can also switch the geometric correction, for example, by automatically changing content of the geometric correction to be performed on the target image. For example, the information processing device according to the embodiment switches between the geometric corrections of four stages described in the foregoing (A) to (D). Moreover, for example, the information processing device according to the embodiment may switch between the geometric correction in the first mode and the geometric correction in the second mode.

Figure 11:
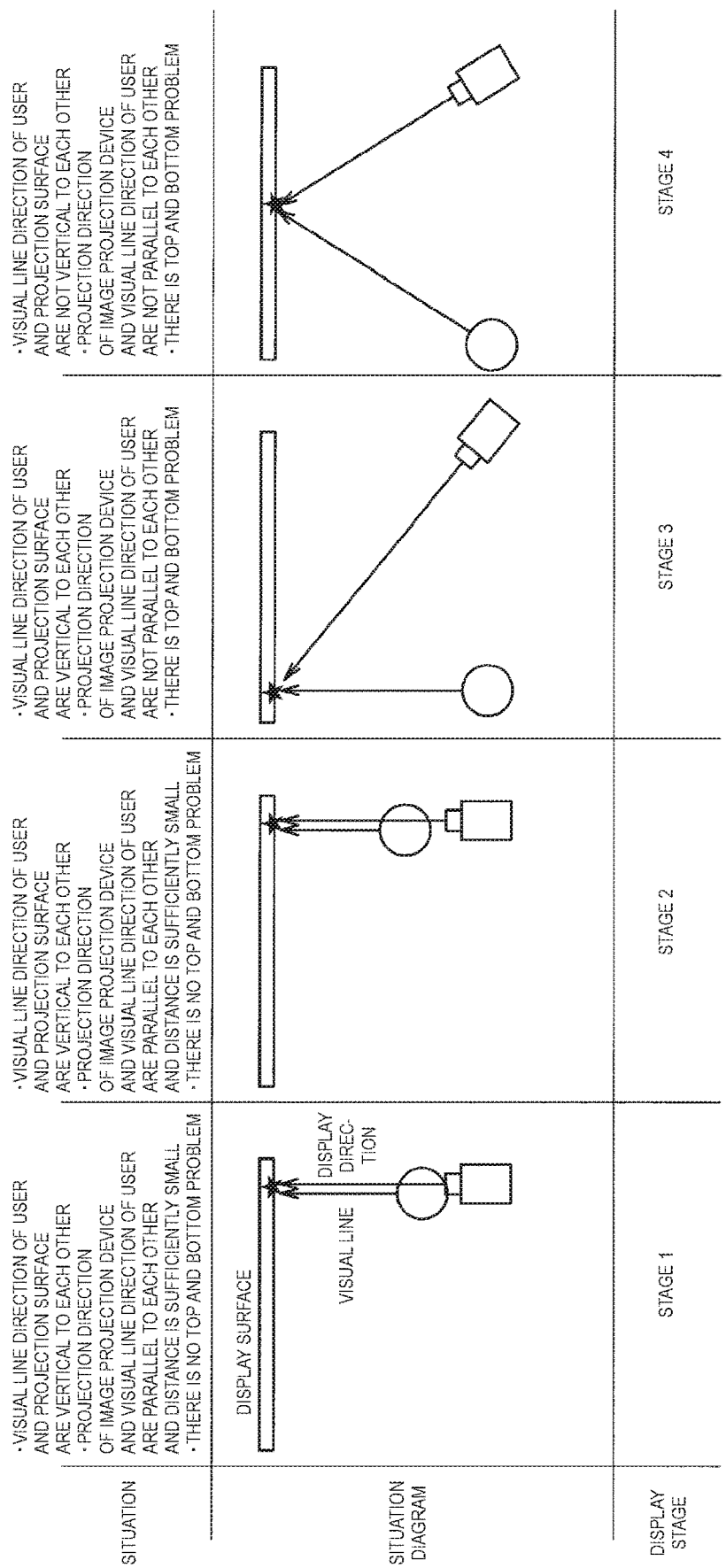
FIG. 11 is an explanatory diagram illustrating an example of a process related to the information processing method according to the embodiment.

FIGS. 10 and 11 are explanatory diagrams illustrating an example of a process related to the information processing method according to the embodiment. FIGS. 10 and 11 illustrate examples of switch conditions of the geometric corrections of four stages described in the foregoing (A) to (D) in the information processing device according to the embodiment. FIGS. 10 and 11 illustrate examples of switch conditions of the geometric corrections in the display environment in which an image is displayed in the display region through projection by the image projection device illustrated in FIG. 2.

The information processing device according to the embodiment switches the geometric correction by changing content of the geometric correction to be performed on the target image, as will be described in the following (I) to (IV), for example.

In addition, next, an example of a case in which the information processing device according to the embodiment switches between the geometric corrections of four stages described in the foregoing (A) to (D) will be exemplified. The switch between the geometric correction in the first mode and the geometric correction in the second mode can also be similarly realized.

Specifically, for example, a case in which the geometric correction of stage 4 described in the foregoing (D) is performed corresponds to a case in which the geometric correction in the first mode is performed. Moreover, for example, a case in which the geometric correction of one of stage 1 to stage 3 described in the foregoing (A) to (C) is performed corresponds to a case in which the geometric correction in the second mode is performed.

(I) First Example of Process Related to Switch of Geometric Correction

For example, the information processing device according to the embodiment changes the content of the geometric correction to be performed on the target image in accordance with the relation between the direction of the user indicated by the direction information and the display region.

More specifically, the information processing device according to the embodiment changes the content of the geometric correction to be performed on the target image between a case in which the relation between the direction of the user and the display region is a first relation in which the direction of the user and the display region are determined to meet at right angles and a case in which the relation between the direction of the user and the display region is a second relation different from the first relation.

Here, the information processing device according to the embodiment determines that the direction of the user and the display region meet at right angles in a case in which an angle between a normal direction of a plane corresponding to the display region estimated on the basis of the 3-dimensional information and the direction of the user indicated by the direction information is less than a set predetermined angle (or the angle is the predetermined angle or less), for example. The predetermined angle may be a fixed angle set in advance or may be a variable value which can be changed on the basis of a user manipulation or the like. As the predetermined angle gets smaller, a reference by which it is determined that the direction of the user and the display region meet at right angles becomes stricter.

For example, as illustrated in FIG. 10, in a case in which the relation between the direction of the user and the display region is the first relation, the information processing device according to the embodiment performs one of the geometric corrections of stage 1 described in the foregoing (A) to stage 3 described in the foregoing (C).

Moreover, as described above, the information processing device according to the embodiment can automatically perform the geometric correction of stage 1 described in the foregoing (A) on the basis of the target image. That is, in a case in which the relation between the direction of the user and the display region is the first relation, the information processing device according to the embodiment does not have to perform the geometric correction on the target image by performing the geometric correction of stage 1 described in the foregoing (A) further on the basis of the target image.

Moreover, for example, as illustrated in FIG. 10, in a case in which the relation between the direction of the user and the display region is the second relation, the information processing device according to the embodiment performs the geometric correction of stage 4 described in the foregoing (D). The reason why the geometric correction of stage 4 described in the foregoing (D) is performed in the case in which the relation between the direction of the user and the display region is the second relation is that the target image tilted to be vertical to the visual line direction of the user is displayed in the display region when the geometric correction of stage 4 is performed, for example, as illustrated in FIG. 9.

(II) Second Example of Process Related to Switch of Geometric Correction

In a case in which the image is displayed in the display region by projecting the image from the image projection device to the display region, as illustrated in FIG. 2, for example, the information processing device according to the embodiment changes the content of the geometric correction to be performed on the target image on the basis of the direction of the user indicated by the direction information and a projection direction of the image from the image projection device to the display region.

More specifically, the information processing device according to the embodiment changes the content of the geometric correction to be performed on the target image between a case in which the relation between the direction of the user and the projection direction is a third relation in which the direction of the user and the projection direction are determined to be parallel to each other and a case in which the relation between the direction of the user and the projection direction is a fourth relation different from the third relation, for example.

Here, for example, in a case in which the angle between the direction of the user and the projection direction is less than a predetermined angle (or the angle is the predetermined angle or less), the information processing device according to the embodiment determines that the direction of the user and the projection direction are parallel to each other. The predetermined angel may be a fixed angle set in advance or may be a variable value which can be changed on the basis of a user manipulation or the like. As the predetermined angle gets smaller, a reference by which it is determined that the direction of the user and the projection direction are parallel to each other becomes stricter.

For example, as illustrated in FIG. 11, in a case in which the relation between the direction of the user and the projection direction is the third relation, the information processing device according to the embodiment performs the geometric correction of stage 1 described in the foregoing (A) or stage 2 described in the foregoing (B).

Moreover, for example, as illustrated in FIG. 11, the information processing device according to the embodiment may further determine whether a distance between the user and the image projection device in a direction parallel to a plane corresponding to the display region is small and may perform the geometric correction of stage 1 described in the foregoing (A) or stage 2 described in the foregoing (B) in a case in which the distance is determined to be small. Here, the information processing device according to the embodiment determines that the distance in the direction parallel to the plane corresponding to the display region is small in a case in which the visual line of the user is determined to be on the display region, for example, on the basis of the direction information or the like.

Moreover, for example, as illustrated in FIG. 11, in a case in which the relation between the direction of the user and the projection direction is the fourth relation, the information processing device according to the embodiment performs the geometric correction of stage 3 described in the foregoing (C) or stage 4 described in the foregoing (D).

(III) Third Example of Process Related to Switch of Geometric Correction

The information processing device according to the embodiment performs a process in which the process related to the first example described in the foregoing (I) and the process related to the second example described in the foregoing (II) are combined.

By performing the process in which the process related to the first example described in the foregoing (I) and the process related to the second example described in the foregoing (II) are combined, for example, the geometric corrections of stage 1 described in the foregoing (A) and stage 4 described in the foregoing (D) are switched as follows. In addition, it is regardless to say that switch examples of the geometric corrections in a process related to the switch of the geometric correction related to the third example are not limited to the following examples.

- A case in which the relation between the direction of the user and the display region is the first relation and the target image is an image indicating content which is not disrupted even without consideration of the top and bottom: the geometric correction of stage 1 described in the foregoing (A) is performed.
- A case in which the relation between the direction of the user and the display region is the first relation and the relation between the direction of the user and the projection direction is the third relation: the geometric correction of stage 2 described in the foregoing (B) is performed.
- A case in which the relation between the direction of the user and the display region is the first relation and the relation between the direction of the user and the projection direction is the fourth relation: the geometric correction of stage 3 described in the foregoing (C) is performed.
- A case in which the relation between the direction of the user and the display region is the second relation: the geometric correction of stage 4 described in the foregoing (D) is performed.

(IV) Another Example of Process Related to Switch of Geometric Correction

In addition, the processes related to the switch of the geometric correction according to the embodiment are not limited to the process related to the first example described in the foregoing (I) to the process related to the third example described in the foregoing (III).

For example, the information processing device according to the embodiment can also switch the geometric correction in accordance with the target image. For example, the geometric correction of stage 1 or stage 2 is performed in a case in which the target image is an image indicating starry sky, and the geometric correction of stage 3 or stage 4 is performed in a case in which the target image is a moving image.

The information processing device according to the embodiment determines content or kind of target image, for example, by analyzing the target image and decides the geometric correction to be performed. Moreover, the information processing device according to the embodiment can also decide the geometric correction to the performed, for example, with reference to data (for example, metadata) which is associated with the target image and indicates a stage of the geometric correction to be performed.

(1-2) Specific Example of Geometric Correction According to Embodiment

Next, the geometric corrections of stage 1 described in the foregoing (A) to stage 4 described in the foregoing (D) will be described more specifically.

(A) Stage 1: Geometric Correction in which Target Image is Displayed without being Corrected As described above, in the geometric correction of stage 1, the information processing device according to the embodiment performs no geometric correction on the target image.

(B) Stage 2: Geometric Correction in which Target Image is Rotated in Visual Line Direction of User and is Displayed FIGS. 12A, 12B, 12C, and 12D are explanatory diagrams illustrating an example of a process related to the information processing method according to the embodiment. FIGS. 12A, 12B, 12C, and 12D illustrates an overview of the geometric correction of stage 2. In FIGS. 12A, 12B, 12C, and 12D, the target image is referred to as an "original image."

For example, the information processing device according to the embodiment calculates an angle $\alpha$ with respect to the visual line direction (which is an example of the direction of the user and the same applies below) of the user from the projection position and an upper direction of the target image which is a geometric correction target. The information processing device according to the embodiment rotates the target image by the calculated angle $\alpha$, as illustrated in FIGS. 12A and 12B.

Accordingly, in a case in which the geometric correction of stage 2 is performed, for example, an image obtained by rotating the target image of stage 1 on the surface of the display region is displayed in the display region, as illustrated in FIGS. 12C and 12D.

(C) Stage 3: Geometric Correction in which Target Image is Aligned with Normal Direction of Display Region FIGS. 13A, 13B, 13C, and 13D are explanatory diagrams illustrating an example of a process related to the information processing method according to the embodiment. FIGS. 13A, 13B, 13C, and 13D illustrate an overview of the geometric correction of stage 3. In FIGS. 13A, 13B, 13C, and 13D, the target image is referred to as an "original image."

Figure 13A:
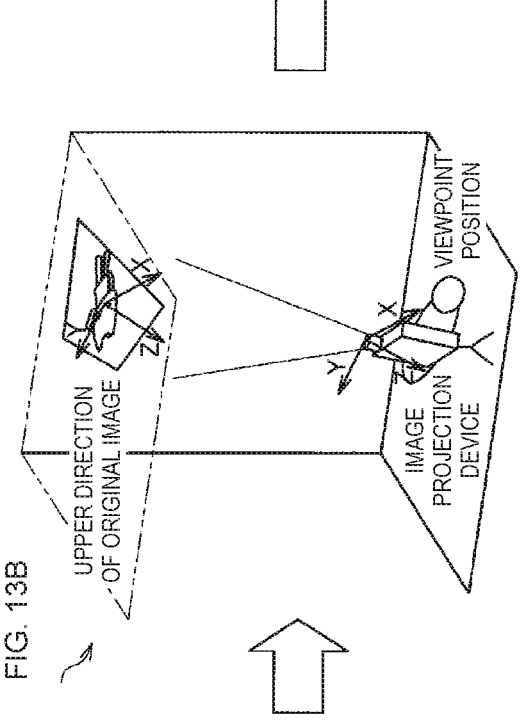
FIGS. 13A, 13B, 13C and 13D are explanatory diagrams illustrating an example of a process related to the information processing method according to the embodiment.

For example, the information processing device according to the embodiment calculates a plane equation corresponding to the display region and the centroid position of a 3-dimensional point group indicated by the 3-dimensional information on the basis of the 3-dimensional information (FIG. 13A).

Figure 13B:
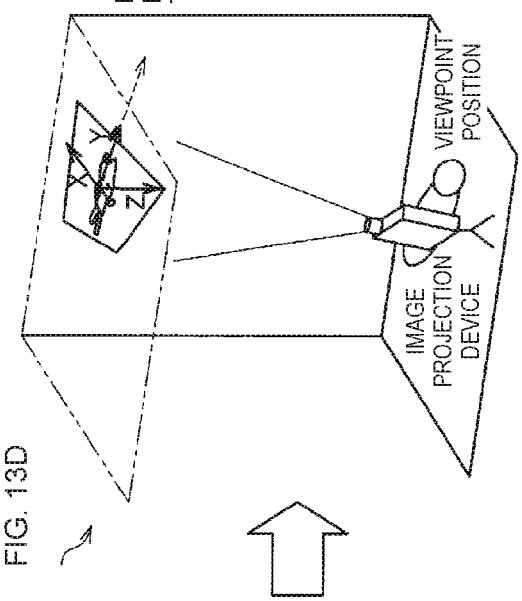
Figure 13C:
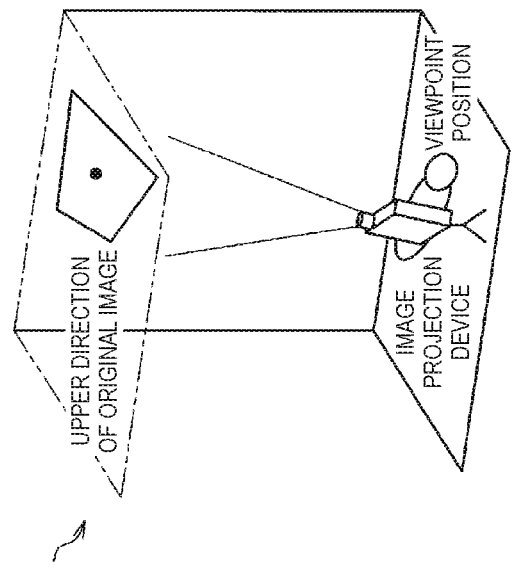

The information processing device according to the embodiment translates the projected image to the calculated centroid position (FIG. 13B). Then, for example, the information processing device according to the embodiment rotates the target image to follow a plane corresponding to the display region estimated by the calculated plane equation (FIG. 13C). In the case of FIG. 13C, the information processing device according to the embodiment rotates the target image so that the Z axis matches the normal direction of the estimated plane.

Figure 13D:
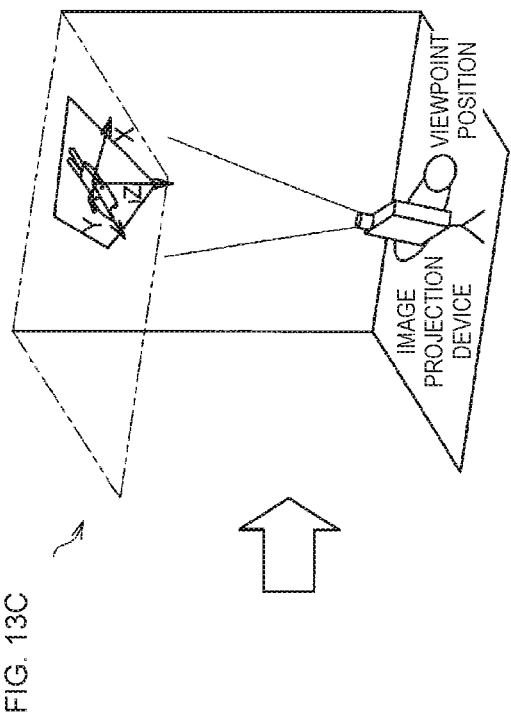

For example, the information processing device according to the embodiment rotates the target image in the visual line direction of the user from the projection position (of FIG. 13D). In the case of FIG. 13D, the information processing device according to the embodiment rotates the target image so that the visual line direction matches the Y axis.

Figure 14B:
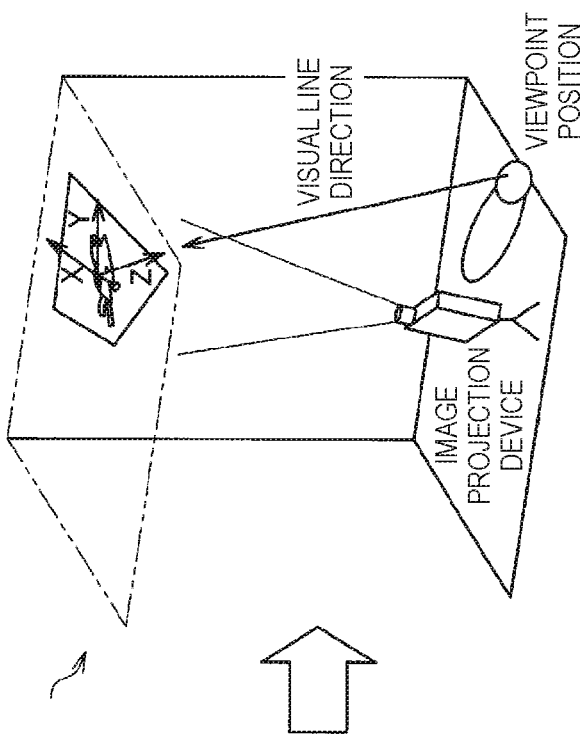
FIGS. 14A and 14B are explanatory diagrams illustrating an example of a process related to the information processing method according to the embodiment.
Figure 14A:
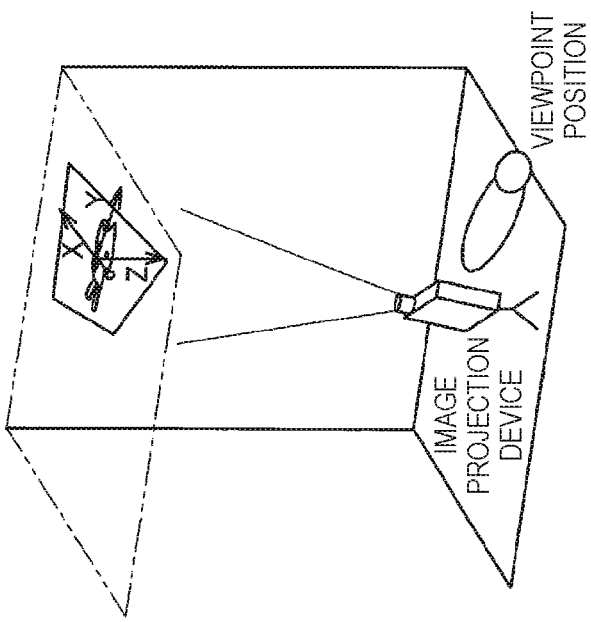

(D) Stage 4: Geometric Correction in which Target Image is Tilted and Displayed in Visual Line Direction of User FIGS. 14A and 14B are explanatory diagrams illustrating an example of a process related to the information processing method according to the embodiment. FIGS. 14A and 14B illustrate an overview of the geometric correction of stage 4. FIG. 14A illustrates a state in which the process related to stage 3 described with reference to FIGS. 13A, 13B, 13C, and 13D is performed on the target image.

For example, after the information processing device according to the embodiment performs the process related to stage 3 described with reference to FIGS. 13A, 13B, 13C, and 13D, the information processing device according to the embodiment further rotates the target image in the visual line direction of the user FIG. 14B). In FIG. 14B, the information processing device according to the embodiment rotates the target image so that the Z axis matches the visual line direction of the user.

The information processing device according to the embodiment performs the foregoing processes in the geometric correction of stage 1 described in the foregoing (A) to stage 4 described in the foregoing (D).

(1-3) Flow of Theoretical Process in Case in which Image is Projected by Performing Geometric Correction According to Embodiment Next, a flow of a theoretical process in a case in which the geometric correction according to the embodiment is performed and an image is projected to a wall, a ceiling, or the like will be described. The flow of the following theoretical process is a flow of a process in a case in which the geometric correction of stage 3 described in the foregoing (C) or the geometric correction of stage 4 described in the foregoing (D) is performed.

As a basic process in a case in which the target image is subjected to geometric transformation and is projected to a certain plane, two processes to be described in the following (i) and (ii) can be exemplified.

(i) An image to be projected is translated to the centroid position estimated on the basis of 3-dimensional information and is rotated to be disposed so that coordinate axes match.

(ii) The disposed image is projected to an image coordinate system (hereinafter referred to as an "image projection device image coordinate system") in an image projection device to obtain an image after the geometric transformation.

First, the process of the foregoing (i) will be described.

A coordinate system of an imaging device in which the position of the image projection device is set as the origin (hereinafter referred to as an "imaging device coordinate system"), a centroid position P of a plane estimated on the basis of the 3-dimensional information, and a coordinate system in which the centroid position P is set as the origin (hereinafter referred to as a "world coordinate system of a plane") will be considered.

FIG. 15 is an explanatory diagram illustrating an example of a process related to the information processing method according to the embodiment. FIG. 15 illustrates examples of the imaging device coordinate system, the world coordinate system of a plane, and coordinates of the centroid position P of the plane.

As illustrated in FIG. 15, the imaging device coordinate system is expressed as "$(X_C, Y_C, Z_C)$" and the world coordinate system of the plane is expressed as "$(X_w, Y_w,$ and $Z_w)$." Moreover, coordinates of the centroid position P of the plane are expressed as "$P=(p_x, p_y, p_z)$." Here, $Z_w$ of the world coordinate system of the plane is assumed to match the normal direction of the plane estimated on the basis of the 3-dimensional information.

Figure 16:
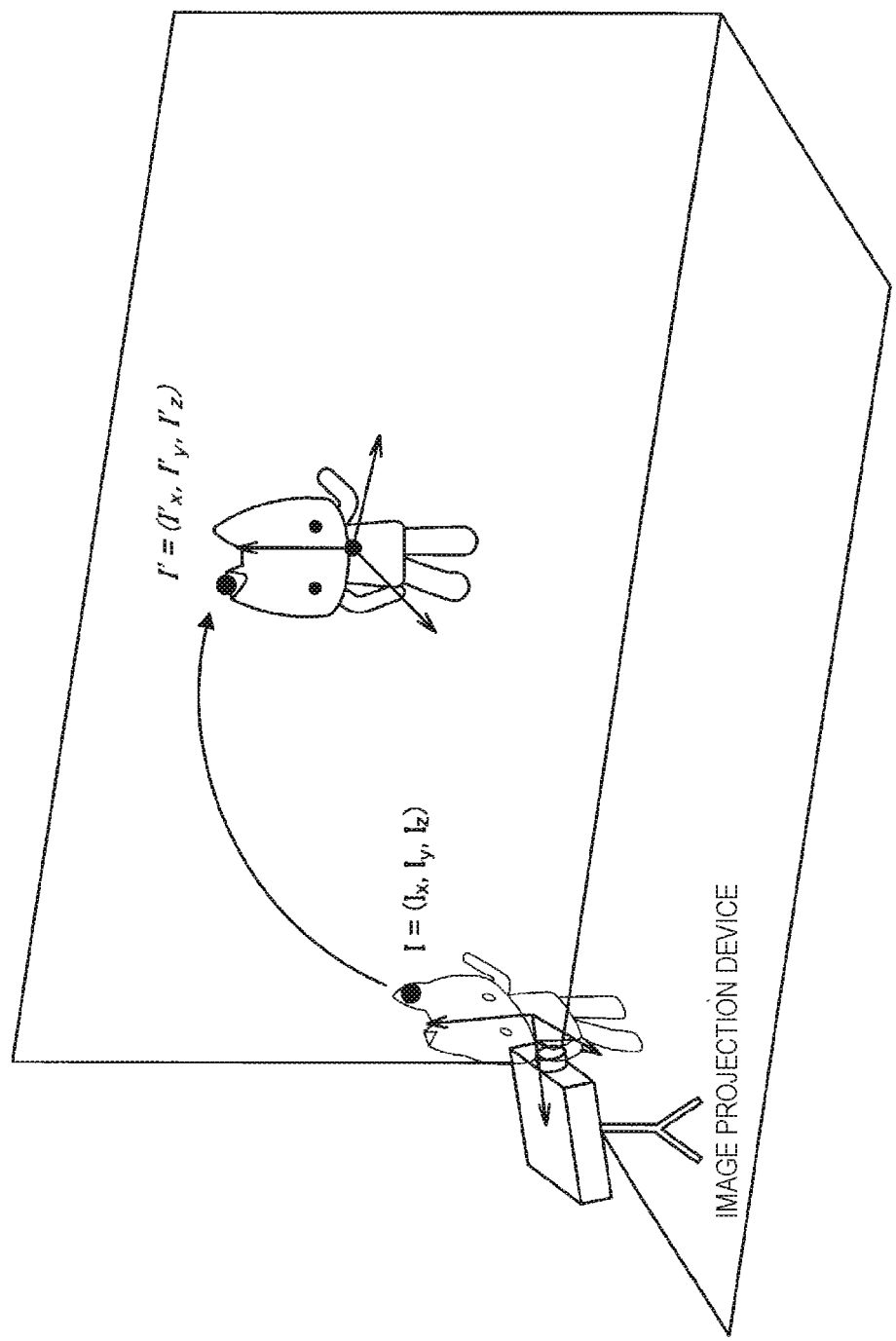
FIG. 16 is an explanatory diagram illustrating an example of a process related to the information processing method according to the embodiment.

FIG. 16 is an explanatory diagram illustrating an example of a process related to the information processing method according to the embodiment. FIG. 16 illustrates an overview of the process of the foregoing (i).

As illustrated in FIG. 16, the imaging device coordinate system ($X_C, Y_C, Z_C$) can be transformed into the world coordinate system $Z_w$) of a plane by translating the axes ($X_C, Y_C,$ and $Z_C$) of the imaging device coordinate system to the centroid position P of the plane and further rotating the axes ($X_C, Y_C,$ and $Z_C$) of the imaging device coordinate system so that the axes ($X_C, Y_C,$ and $Z_C$) of the imaging device coordinate system match the world coordinate system ($X_w, Y_w, Z_w$) of the plane.

At this time, a transformation matrix for transforming the imaging device coordinate system ($X_C, Y_C, Z_C$) into the world coordinate system ($X_w, Y_w, Z_w$) of the plane is expressed by, for example, the following Equation 1. Here, "r" in Equation 1 is an element of a rotation matrix and "t" corresponds to an element of translation.

[Math. 1]

$$M = \begin{pmatrix} r_{11} & r_{12} & r_{13} & t_1 \\ r_{12} & r_{22} & r_{23} & t_2 \\ r_{13} & r_{32} & r_{33} & t_3 \end{pmatrix} \quad \text{(Equation 1)}$$

By using the rotation matrix expressed in the foregoing Equation 1, an image can be transformed to any position. For example, as illustrated in FIG. 16, a point $I=(I_x, I_y, I_z)$ expressed as the imaging device coordinate system in an image is transformed into a point $I'=(I'_x, I'_y, I'_z)$ by performing calculation expressed by the following Equation 2 using the rotation matrix expressed by the foregoing Equation 1.

[Math. 2]

$$I'=MI \quad \text{(Equation 2)}$$

For example, an image can be disposed to any plane by performing the foregoing process.

Next, the process of the foregoing (ii) will be described.

FIGS. 17A and 17B are explanatory diagrams illustrating an example of a process related to the information processing method according to the embodiment. FIGS. 17A and 17B illustrate an overview of the process of the foregoing (ii).

In the process of the foregoing (ii), an image to be projected can be obtained by transforming an image subjected to 3-dimensional geometric transformation to coordinates in the imaging device coordinate system.

Specifically, for example, image coordinates x(u, v) of a corresponding point can be obtained by performing calculation of Equation 3 and Equation 4 listed below on the coordinates I' by using internal parameters of the image projection device. The coordinates I' is transformed by using the foregoing Equation 2. As the internal parameters of the image projection device, for example, four parameters including focal distances $f_x$ and $f_y$ and image centers $C_x$ and $C_y$ expressed in pixel unit, can be exemplified.

[Math. 3]

$$u = f_x * \frac{I'_x}{I'_z} + c_x \qquad \text{(Equation 3)}$$

[Math. 4]

$$v = f_y * \frac{I'_y}{I'_z} + c_y \qquad \text{(Equation 4)}$$

An image to be projected can be obtained by performing calculation using the foregoing Equation 3 and Equation 4 on the coordinates I' transformed by using the foregoing Equation 2, respectively.

Next, the geometric correction of stage 3 described in the foregoing (C) and the geometric correction of stage 4 described in the foregoing (D) will be described on the basis of the process of the foregoing (i) and the process of the foregoing (ii).

Figure 19A:
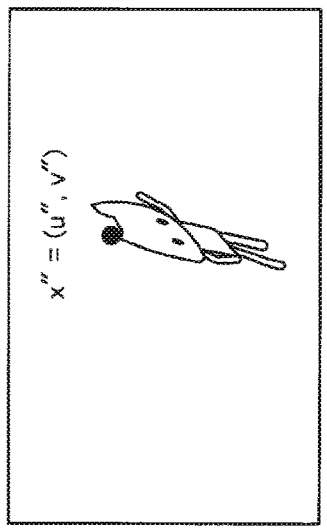
FIGS. 19A and 19B are explanatory diagrams illustrating an example of a process related to the information processing method according to the embodiment.
Figure 19B:
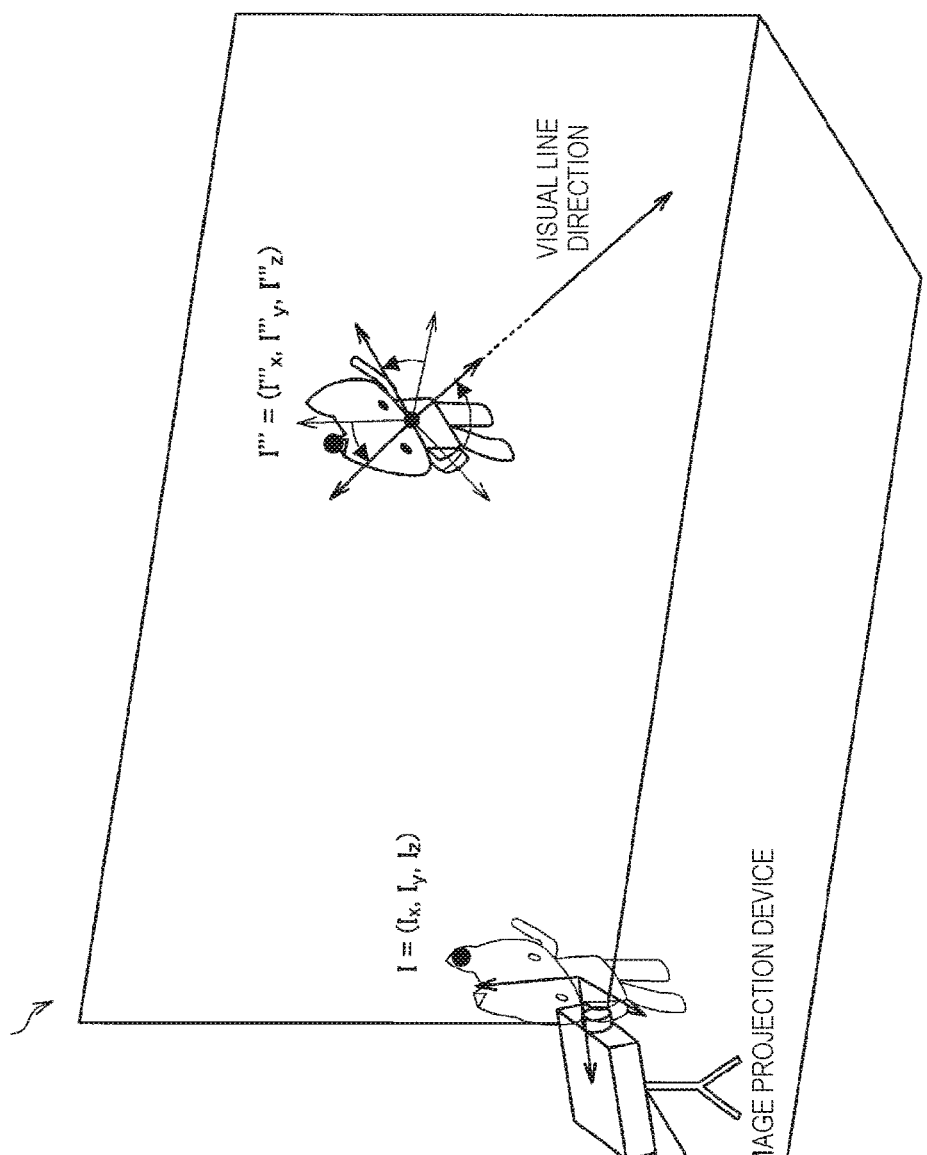

FIGS. 18A and 18B are explanatory diagrams illustrating an example of a process related to the information processing method according to the embodiment. FIGS. 18A and 18B illustrate an overview of the geometric correction of stage 3 described in the foregoing (C). Moreover, FIGS. 19A and 19B are explanatory diagrams illustrating an example of a process related to the information processing method according to the embodiment. FIGS. 19A and 19B illustrate an overview of the geometric correction of stage 4 described in the foregoing (D). FIG. 18A and FIG. 19A illustrate examples of images to be projected by the image projection device (examples of images displayed in the display region). As illustrated in FIG. 18A and FIG. 19A, a tetragonal image with a predetermined aspect ratio such as 16:9 or 4:3 is distorted when the geometric correction of stage 3 described in the foregoing (C) or the geometric correction of stage 4 described in the foregoing (D) is performed.

In a case in the geometric correction of stage 3 described in the foregoing (C) is performed, the information processing device according to the embodiment rotates the display position on a plane corresponding to the display region so that the target image faces in the direction of the user. Specifically, the information processing device according to the embodiment further performs a process of rotating the Z axis (a normal direction of the plane corresponding to the display region) when the process of the foregoing (i) is performed, as illustrated in FIGS. 18A and 18B.

Here, when R' is a matrix for rotation along the Z axis (which is an example of a predetermined axis) by the rotation angle α, a matrix R' is expressed as the following Equation 5. Here, the matrix R' expressed in Equation 5 is an example of a matrix in a case in which rotation is performed in a side surface direction of an image. Such rotation is effective in a case in which a top and bottom problem occurs.

[Math. 5]

$$R' = \begin{pmatrix} \cos(\alpha) & -\sin(\alpha) & 0 \\ \sin(\alpha) & \cos(\alpha) & 0 \\ 0 & 0 & 1 \end{pmatrix} \qquad \text{(Equation 5)}$$

A point $I=(I_x, I_y, I_z)$ expressed with the imaging device coordinate system in the image is transformed into a point $I''=(I''_x, I''_y, I''_z)$ by performing calculation expressed as the following Equation 6 using the rotation matrix expressed as the foregoing Equation 1 and the matrix R' expressed as the foregoing Equation 5.

[Math. 6]

$$I''R'MI \qquad \text{(Equation 6)}$$

The information processing device according to the embodiment obtains the target image subjected to the geometric correction of stage 3 described in the foregoing (C) by performing the process of the foregoing (ii) after performing the calculation of the foregoing Equation 6.

Moreover, in a case in which the geometric correction of stage 4 described in the foregoing (D) is performed, the information processing device according to the embodiment rotates the display position 3-dimensionally to generate an image obtained by tilting the target image in the direction of the user. Specifically, as illustrated in FIGS. 19A and 19B, when the process of the foregoing (i) is performed, the information processing device according to the embodiment performs a rotation process so that the Z axis (the normal direction of the plane corresponding to the display region) matches the direction of the user indicated by the direction information.

Here, when R" is a matrix for rotation so that the Z axis (which is an example of a predetermined axis) matches the direction of the user indicated by the direction information, the matrix R" is expressed as the following Equation 7.

[Math. 7]

$$R'' = \begin{pmatrix} r''''_{11} & r''''_{12} & r''''_{13} \\ r''''_{21} & r''''_{22} & r''''_{23} \\ r''''_{31} & r''''_{32} & r''''_{33} \end{pmatrix} \qquad \text{(Equation 7)}$$

A point $I=(I_x, I_y, I_z)$ expressed using the imaging device coordinate system in the image is transformed into a point $I'''=(I'''_x, I'''_y, I'''_z)$ by performing calculation expressed as the following Equation 8 using the rotation matrix expressed as the foregoing Equation 1 and the matrix R" expressed as the foregoing Equation 7.

[Math. 8]

$$I'''R''MI \qquad \text{(Equation 8)}$$

The information processing device according to the embodiment obtains the target image subjected to the geometric correction of stage 4 described in the foregoing (D) by performing the process of the foregoing (ii) after performing the calculation of the foregoing Equation 8.

(1-4) Another Example of Image Processing According to Embodiment

For example, the information processing device according to the embodiment performs the geometric correction on the target image, as described above. In addition, examples of the image processing according to the embodiment are not limited to the above-described processes.

The information processing device according to the embodiment can perform one or two or more processes among a process to be described in the following (1-4-1) to a process described in the following (1-4-3), as the image processing according to the embodiment.

(1-4-1) Control Related to Tracking Based on Direction Information

When a process is performed on the basis of the direction of the user indicated by the direction information, the content of the geometric correction performed on the target image may be frequently changed due to the visual line or a motion or the like of the body of the user in a case in which a process is performed strictly. Moreover, in a case in which the content of the geometric correction is frequently changed, an image displayed in the display region is frequently changed. Moreover, there is a concern that a display region to be set is also frequently changed similarly. In a case in which the display region to be set is frequently changed, a position at which an image is displayed is frequently changed.

Accordingly, the information processing device according to the embodiment suppress a frequent change in an image displayed in the display region or a position in which the image is displayed, as described above, by performing control described in the following (a) to (c), for example.

(a) Control Method 1: Performing Process by Trigger

The information processing device according to the embodiment retains a state in which the direction information to be acquired is tracked and a state in which the direction information to be acquired is tracked and switches the states by a trigger. A system applied to, for example, a case in which the user temporarily leaves a space of the display environment by switching the states by a trigger is realized.

Here, as the trigger according to the embodiment, for example, performing a manual manipulation such as pressing a button for switching the states, an utterance of a voice for switching the states, or a gesture for switching the states can be exemplified. For example, the manual manipulation for switching the states is performed on any device such as a remote controller, a smartphone, or a tablet.

(b) Control Method 2: Performing Process with Hysteresis

The information processing device according to the embodiment causes the display region to have hysteresis and performs the process based on the direction information, for example, in a case in which the direction of the user indicated by the direction information deviates from the display region. Moreover, the information processing device according to the embodiment resets the display region on the basis of the direction information in a case in which stasis of the direction of the user is detected (for example, a case in which the user is in a state in which the user views the same location for a given time) on the basis of the direction information.

(c) Control Method 3: Performing Process Based on Change in Plane

The information processing device according to the embodiment performs a process based on the direction information, for example, in a case in which the direction of the user indicated by the direction information is changed from a plane corresponding to the display region to another plane. Moreover, the information processing device according to the embodiment rests the display region on the basis of the direction information in a case in which stasis of the direction of the user is detected on the basis of the direction information.

(1-4-2) Process in Case in which there are Plurality of Users

For example, there are a plurality of users in the space of the display environment illustrated in FIG. 2 in some cases. Accordingly, next, an example of a process in a case in which there are the plurality of users in the space of the display environment will be described.

In a case in which direction information regarding each of the plurality of users is acquired, the information processing device according to the embodiment decides a direction of one user on the basis of the respective directions of the plurality of users indicated by the plurality of pieces of direction information.

For example, the information processing device according to the embodiment sets respective vectors corresponding to the directions of the users on the basis of the acquired pieces of direction information regarding the plurality of users and calculates an average vector of the set vectors. Here, as the set vector, for example, a vector that has a direction indicated by the direction information and a set predetermined magnitude can be exemplified.

Then, the information processing device according to the embodiment determines a direction of the average vector as the direction of the one user.

Here, for example, the information processing device according to the embodiment decides the direction of the one user using all the pieces of acquired direction information.

In addition, the process in a case in which there are the plurality of users is not limited to the process in which all the pieces of acquired direction information are used. For example, the information processing device according to the embodiment may decide the direction of the one user using the direction information (to be described below) used for setting the display region, or can also decide the direction of the one user using a piece of direction information corresponding to a user authenticated in conformity with any scheme such as face authentication performed using a captured image.

Figure 20:
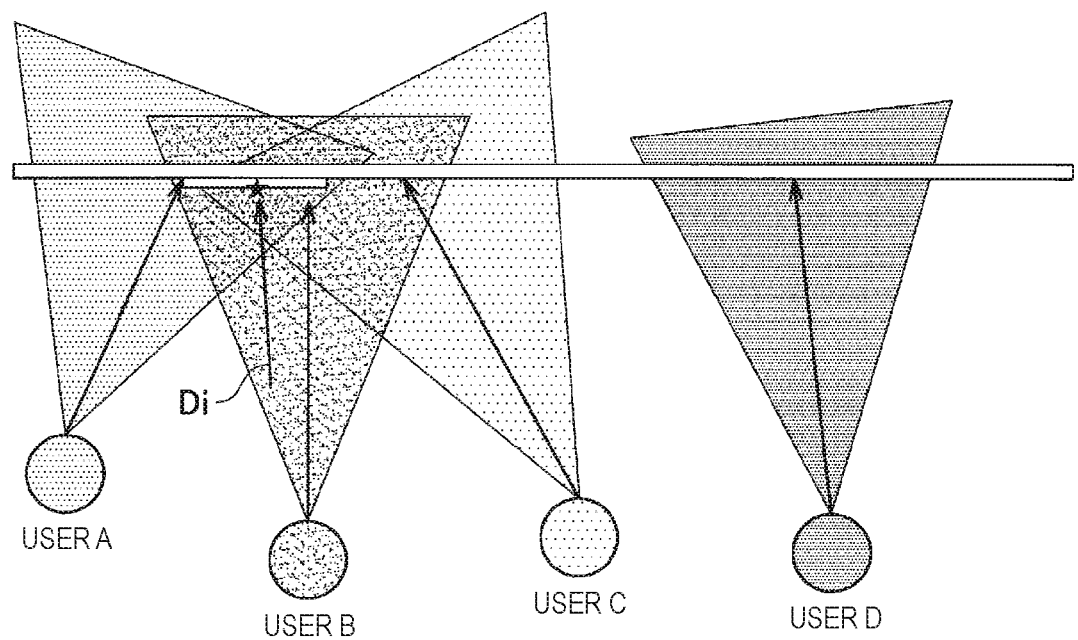
FIG. 20 is an explanatory diagram illustrating an example of a process related to the information processing method according to the embodiment.

FIG. 20 is an explanatory diagram illustrating an example of a process related to the information processing method according to the embodiment. FIG. 20 illustrates an overview of a process in a case in which there are a plurality of users.

FIG. 20 illustrates an example in which a direction (a direction indicated by Di in FIG. 20) of one user is decided on the basis of directions of users indicated by pieces of the direction information corresponding to three users, users A to C among four users, users A to D.

When the direction of the one user is decided, as described above, the information processing device according to the embodiment performs the geometric correction on the target image instructed to be displayed in the display region on the basis of the decided direction of the user as in the above-described case based on the piece of direction information regarding one user.

(1-4-3) Geometric Transformation when Image is Displayed on a Plurality of Plane Boundaries In the example of the above-described geometric transformation, the case in which the display region is one plane has been exemplified. However, the image processing according to the embodiment can also be applied to a case in which the display region spans a plurality of planes. Here, the case in which the display region spans the plurality of planes corresponds to, for example, a case in which a plurality of planes are estimated on the basis of 3-dimensional information.

In a case in which the display region spans the plurality of planes, that is, a case in which the display region is a plurality of planes, the information processing device according to the embodiment performs geometric correction on each portion of a target image displayed in each of the planes included in the display region. Specifically, in a case in which the display region spans the plurality of planes, the information processing device according to the embodiment segments a target image instructed to be displayed in the display region into a plurality of regions and performs the geometric transformation on the segmented regions (hereinafter referred to as a "segment region") in accordance with the planes on which the segment regions are displayed.

Figure 21A:
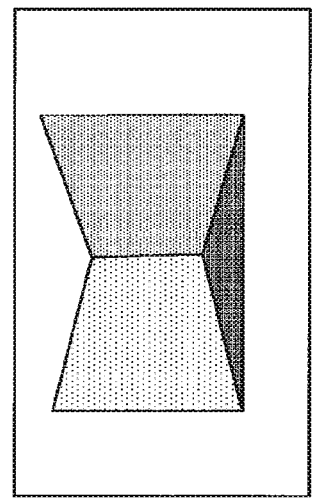
FIGS. 21A and 21B are explanatory diagrams illustrating an example of a process related to the information processing method according to the embodiment.
Figure 21B:
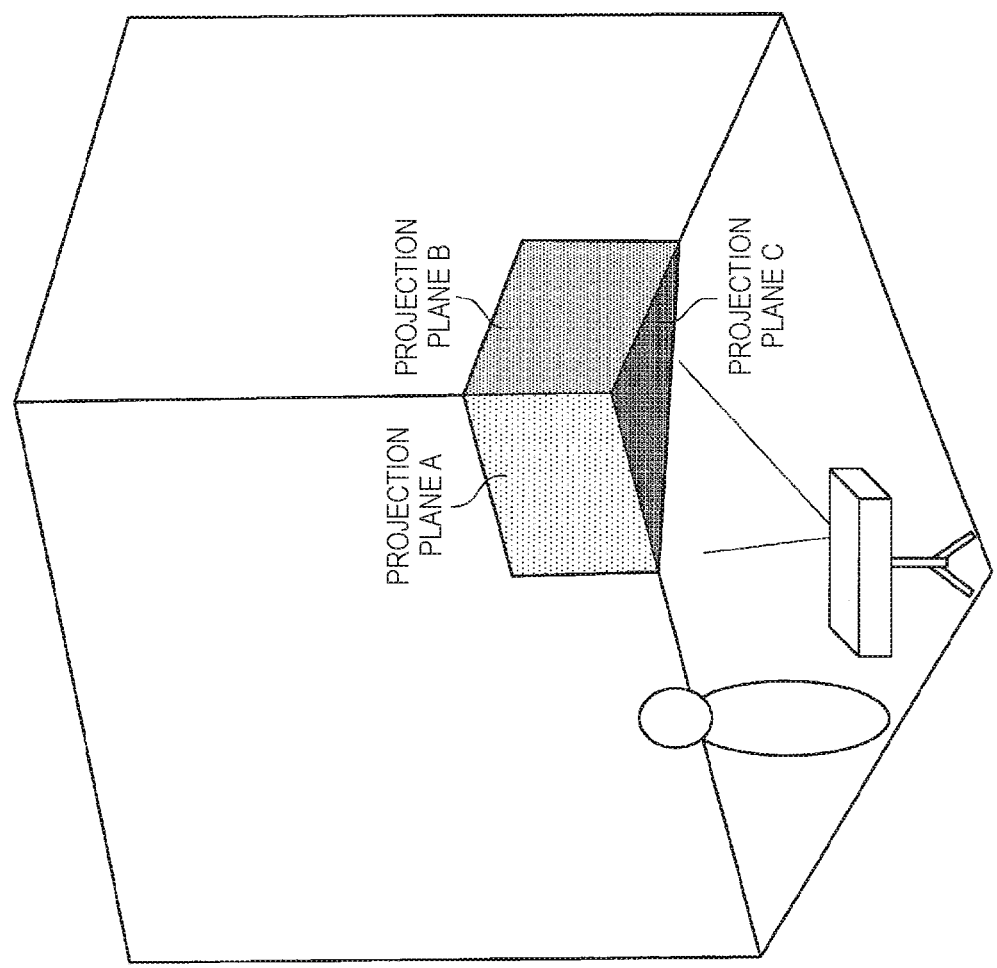
Figure 22A:
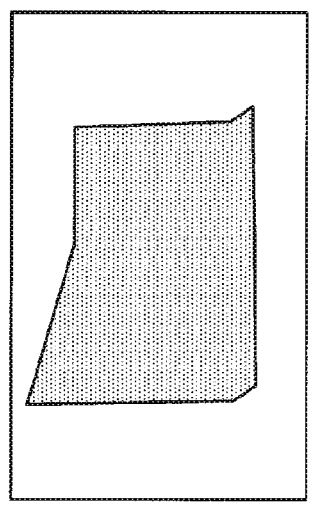
FIGS. 22A and 22B are explanatory diagrams illustrating an example of a process related to the information processing method according to the embodiment.
Figure 22B:
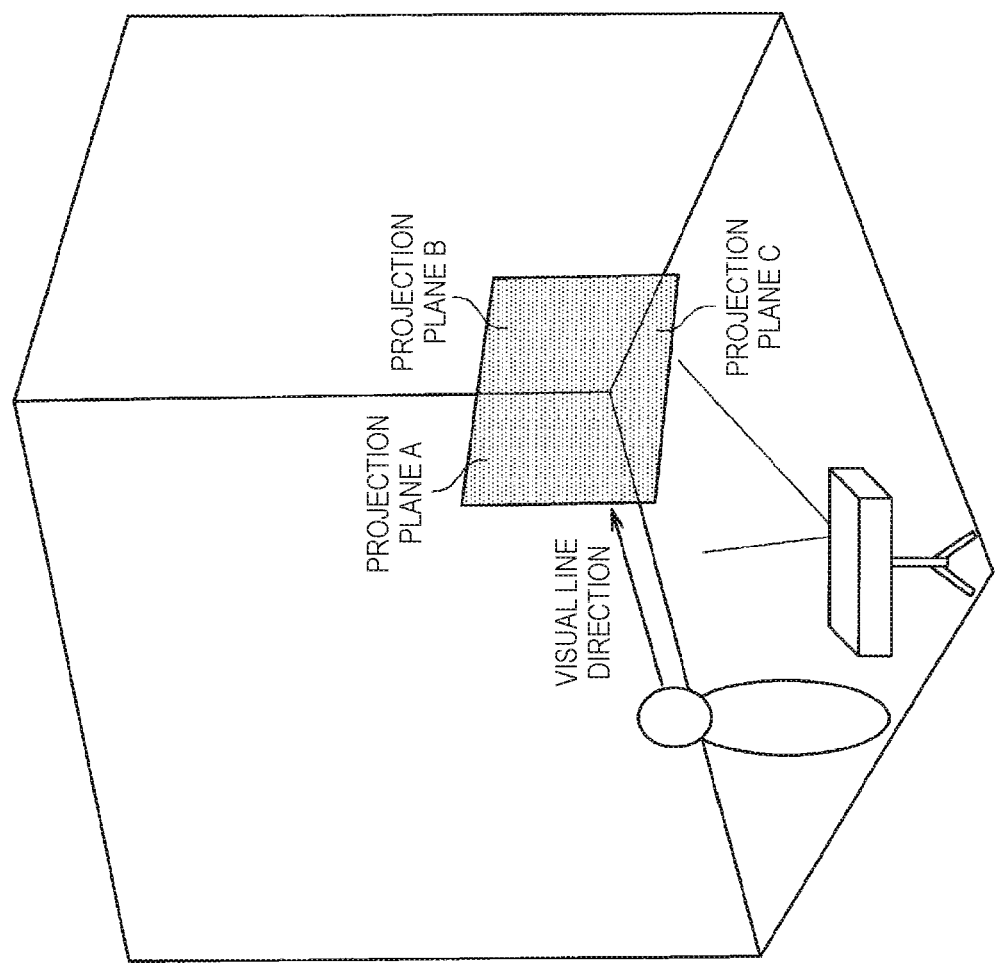

FIGS. 21A and 21B are explanatory diagrams illustrating an example of a process related to the information processing method according to the embodiment. FIGS. 21A and 21B illustrate an overview of a case in which the geometric correction of stage 3 described in the foregoing (C) is performed when the display region spans a plurality of planes. Moreover, FIGS. 22A and 22B are explanatory diagrams illustrating an example of a process related to the information processing method according to the embodiment. FIGS. 22A and 22B illustrate an overview of a case in which the geometric correction of stage 4 described in the foregoing (D) is performed when the display region spans a plurality of planes.

First, an example of a process in a case in which the geometric correction of stage 3 described in the foregoing (C) is performed will be described.

In a case in which the segment region corresponds to a projection plane A illustrated in FIGS. 14A and 14B, the information processing device according to the embodiment perform the geometric transformation in accordance with the world coordinate system of the projection plane A. Moreover, even in a case in which the segment regions correspond to projection planes B and C illustrated in FIGS. 14A and 14B the geometric transformation is similarly performed in accordance with the world coordinate system of each plane. Here, on the projection plane C in which a top and bottom problem may occur, the information processing device according to the embodiment prevents the top and bottom problem from occurring, for example, by performing rotation around the normal direction of the plane in the direction of the user.

Then, the information processing device according to the embodiment obtains an image after the geometric transformation by performing the process of the foregoing (ii).

Next, an example of a process in a case in which the geometric correction of stage 4 described in the foregoing (D) will be described.

In a case in which the geometric correction of stage 4 described in the foregoing (D) is performed, the information processing device according to the embodiment performs 3-dimensional rotation so that the direction of the user (corresponding to the visual line direction in FIGS. 22A and 22B) matches the normal direction of the projection plane after transformation to the projection plane on which each segment region is displayed. Then, the information processing device according to the embodiment obtains an image after the geometric transformation by performing the process of the foregoing (ii).

(1-5) Another Example of Technique for Geometric Correction According to Embodiment As the examples of the geometric correction according to the embodiment, the geometric correction of stage 1 described in the foregoing (A) to the geometric correction of stage 4 described in the foregoing (D) performed on the basis of the direction information have been described. However, examples of the geometric correction which can be applied in the display environment according to the embodiment are not limited to the above-described examples. For example, the following geometric correction may be performed in the display environment according to the embodiment.

Trapezoidal correction which is performed by the image projection device such as a projector (for example, a manual manipulation is performed by a user).

Plane estimation is performed on the basis of 3-dimensional information acquired through measurement by a depth sensor or the like and correction is performed on the basis of a geometric relation of a plane estimated as an image projection device such as a projector.

The image projection device such as a projector displays an image serving as a marker (for example, a cyber code or a 2-dimensional barcode) and a user images the marker using an imaging device so that the marker can be observed and recognized to obtain the direction of the user from a projection direction and a projection surface of the image projection device. Then, the information processing device according to the embodiment performs the geometric correction on the basis of the direction information indicating the obtained direction of the user.

The user retains a device radiating a marker (for example, a cyber code, a 2-dimensional barcode, or a user-recognizable bright spot tracing a wall surface) and the image projection device such as a projector observes the marker to obtain the direction of the user from the projection direction and the projection surface of the image projection device. Then, the information processing device according to the embodiment performs the geometric correction on the basis of the direction information indicating the obtained direction of the user.

A marker (for example, a cyber code or a 2-dimensional barcode) is installed on the plane in a space and the image projection device such as a projector recognizes the marker and performs the geometric correction.

The information processing device according to the embodiment performs, for example, the foregoing image processing as the process related to the information processing method according to the embodiment.

In addition, as described above, the process related to the information processing method according to the embodiment is not limited to the process (image processing) of the foregoing (1). For example, the information processing device according to the embodiment can also perform one or both of (2) a display region setting process and (3) a display control process to be described below as the process related to the information processing method according to the embodiment.

(2) Display Region Setting Process

For example, the information processing device according to the embodiment sets the display region.

(2-1) First Example of Display Region Setting Process

The information processing device according to the embodiment sets the display region using a detection result of a sensor obtained by setting the space of the display environment as a sensing target, such as an image captured by an imaging device disposed in the space illustrated in FIG. 2.

The information processing device according to the embodiment sets the display region at a position specified on the basis of the detection result of the sensor and associated with a location at which the user is located in the space. For example, the information processing device according to the embodiment specifies the display region associated with the location at which the user is located using a table (or a database) in which a location is associated with the display position.

As an example of the display region set through the display region setting process related to a first example, the display region is set at a predetermined position on the wall in the front of the sofa in a case in which the user is sitting on a sofa, or the display region is set at a predetermined position on a ceiling in a case in which the user is lying on a bed.

(2-2) Second Example of Display Region Setting Process

The information processing device according to the embodiment sets the display region on the basis of the direction information.

For example, the information processing device according to the embodiment specifies a set reference position using the direction of the user indicated by the direction information. Subsequently, as described above, the information processing device according to the embodiment sets the display region on the basis of the set reference position.

In addition, as described in the foregoing (1-4-1), when the process is performed on the basis of the direction of the user indicated by the direction information, there is a concern that the display region is frequently changed similarly due to a visual line or a motion of the body of the user in a case in which the process is performed strictly. Then, in a case in which the display region to be set is frequently changed, a position at which an image is displayed is frequently changed.

Accordingly, the information processing device according to the embodiment may perform the control described in the foregoing (a) to (c) described in the forgoing (1-4-1). By performing the control described in the foregoing (a) to (c), it is possible to suppress a frequent change in the position at which the image is displayed.

(2-3) Third Example of Display Region Setting Process

As described above, for example, a plurality of users can also be in the space of the display environment illustrated in FIG. 2. An example of a process in a case in which the plurality of users are in the space of the display environment will be described as the display region setting process related to the third example.

The information processing device according to the embodiment estimates the number of users who are in the space, the viewpoint position of each user, and the direction of each user such as a visual line direction on the basis of the direction information acquired for each user.

Moreover, the information processing device according to the embodiment sets the display region using the obtained direction of the user as follows.

The information processing device according to the embodiment maps a field of view with respect to a visual line to an actual space and decides a centroid of a product region of the mapped region. Then, for example, the information processing device according to the embodiment sets a display region on the basis of the decided centroid position, for example, sets the decided centroid position as the centroid position of the display region. Here, in a case in which all the users do not face in the same direction, the information processing device according to the embodiment decides a centroid of the product region, for example, using a direction of a specific user such an authenticated person or a voting system.

The information processing device according to the embodiment decides an average vector of vectors corresponding to the directions of the respective users as a direction of one user. Then, the information processing device according to the embodiment sets the display region by performing a process similar to the display region setting process related to the second example described in the foregoing (2-2) using the decided direction of one user.

Here, the display region may be set on the basis of direction information regarding a specific user. As the specific user, for example, a "user who is a subject viewing an image designated by a user manipulation" or a "user excluded from a user who is not a subject viewing the image designated by a user manipulation" can be exemplified. Moreover, the specific user may be, for example, a user authenticated in conformity with any scheme.

As the user manipulation related to the designation of the user, for example, a manipulation performed on a captured image or a gesture manipulation such as a gesture of a specific user, such as a user who is a subject viewing an image or an authenticated user, pointing another user can be exemplified.

Figure 23:
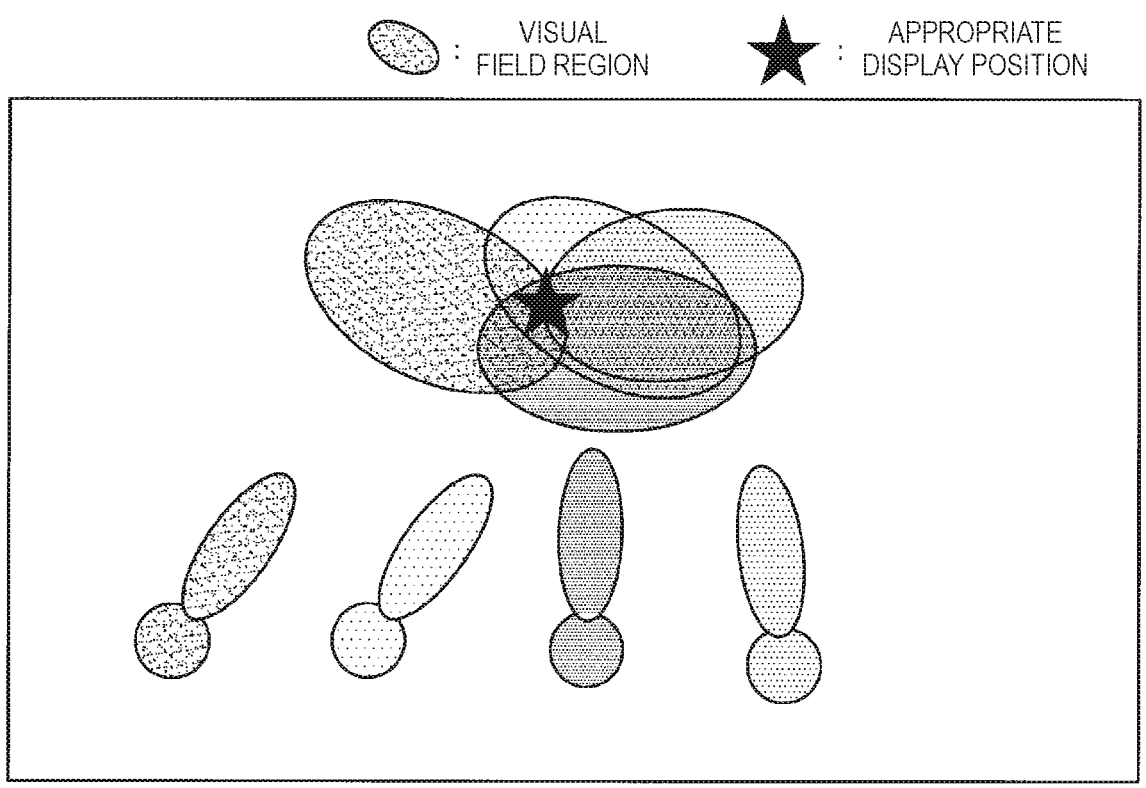
FIG. 23 is an explanatory diagram illustrating an example of a process related to the information processing method according to the embodiment.

FIG. 23 is an explanatory diagram illustrating an example of a process related to the information processing method according to the embodiment. FIG. 23 illustrates an example of the display region setting process related to the third example.

For example, in a case in which the display region is set on a ceiling on the basis of visual line directions of a plurality of users, as illustrated in FIG. 23, a field of view corresponding to a visual line direction of each user is mapped to an actual space and a centroid of a product region of the mapped regions is decided. Then, for example, the information processing device according to the embodiment sets the display region on the basis of the decided centroid position.

Specifically, the field of view of humans is about 200 [degrees] in a horizontal direction and about 125 [degrees] in a vertical direction (75 [degrees] in a downward direction and 50 [degrees] in upward direction). A field-of-view region is mapped in the visual line direction, an appropriate position is searched for, and the display region is set. Moreover, for example, as illustrated in FIG. 23, in a case in which the display region is set on the basis of the visual line directions of the plurality of users, as described above, the geometric correction is performed to correspond to a direction of one user decided using, for example, the average vector or the like.

Moreover, for example, in a case in which a user who is not a subject (hereinafter referred to as a "user other than a subject") viewing an image is designated by a user manipulation, the information processing device according to the embodiment can also set the display region in a region not included in the human visual field of the user other than a subject in a space.

Figure 24:
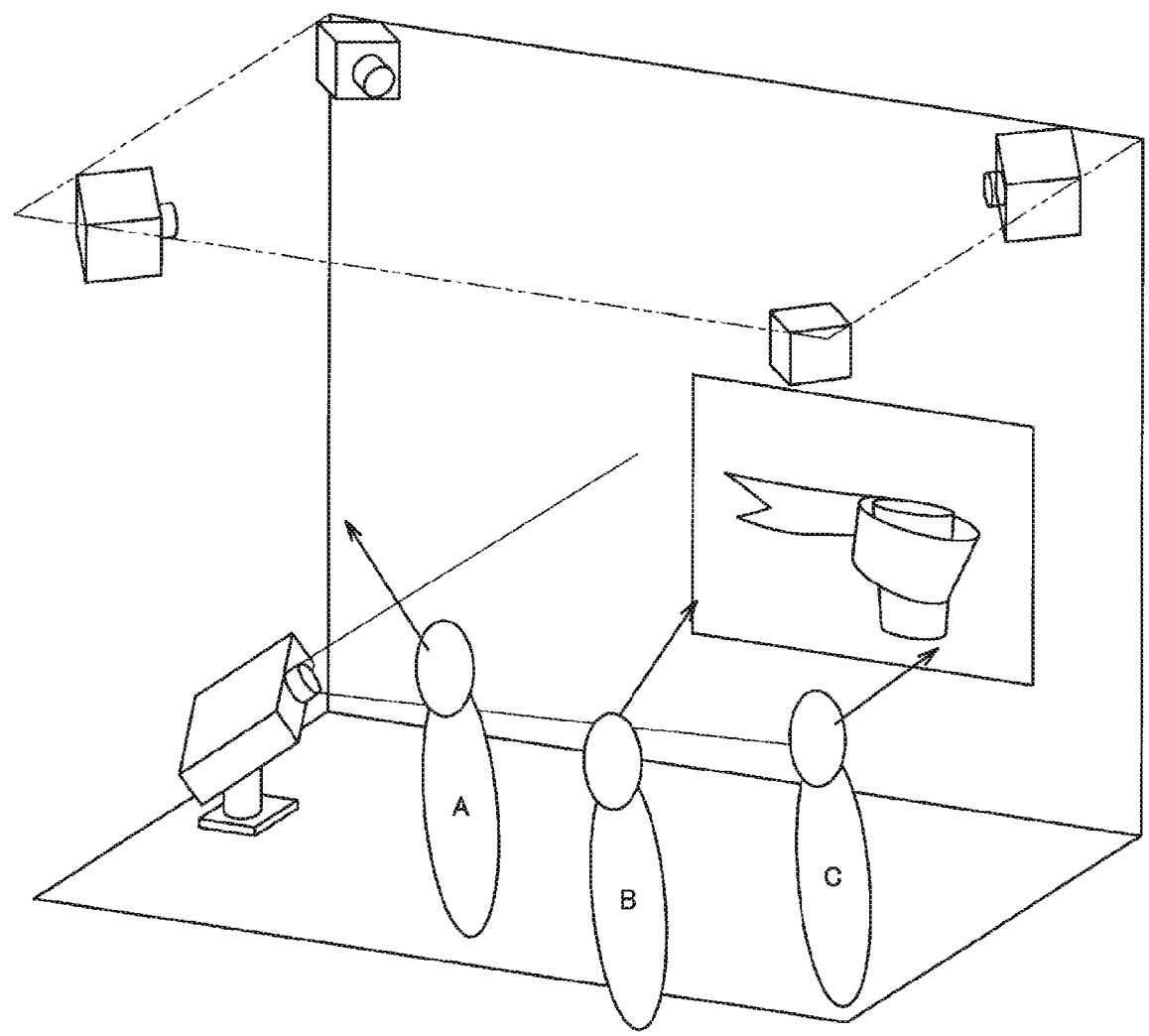
FIG. 24 is an explanatory diagram illustrating an example of a process related to the information processing method according to the embodiment.

FIG. 24 is an explanatory diagram illustrating an example of a process related to the information processing method according to the embodiment. FIG. 24 illustrates another example of the display region setting process related to the third example. FIG. 24 illustrates an example in which a user A corresponds to the user other than the subject.

The information processing device according to the embodiment estimates a visual field of the user A other than the subject on the basis of the direction information regarding the user A. In addition, the display region is set at a position which is not included in the visual field of the user A. In addition, the information processing device according to the embodiment does not set the display region in a case in which it is impossible to set the display region at the position which is not included in the visual field of the user A. The information processing device according to the embodiment can also set the display region when it becomes possible to set the display region at the position which is not included in the visual field of user A.

By setting the display region at a position which is not included in the visual field of user A who is a user other than a subject, as described above, as illustrated in FIG. 24, it is possible to realize that an image displayed in the display region is not viewed by user A.

Moreover, in a case in which the direction of the user A who is a user other than a subject is changed in a use case illustrated in FIG. 24, the information processing device according to the embodiment resets the display region on the basis of the direction information regarding the user A. Here, the resetting of the display region based on the direction information regarding the user A who is a user other than a subject includes, for example, "resetting of the display region such that the display region is at a position which is not included in the visual field of user A" and "setting of no display region (for example, a case in which it is impossible to set the display region at a position not included in the visual field of the user A)."

(3) Display Control Process

The information processing device according to the embodiment causes the target image subjected to the geometric correction through the process (the image processing) of the foregoing (1) to be displayed in the display region.

For example, in a case in which an image is displayed in the display region by projecting the image from an image projection device, the information processing device according to the embodiment causes an image subjected to the geometric correction to be displayed in the display region by controlling the projection of the image from the image projection device, as described above. Moreover, for example, in a case in which the image projection device is mounted on a device that has a pan tilt mechanism such as on a platform or the like, the information processing device according to the embodiment may cause the target image subjected to the geometric correction to be displayed in the display region by controlling a motion of the device that has the pan tilt mechanism, as described above.

Moreover, for example, in a case in which an image is displayed in the display region by displaying the image using a display device, the information processing device according to the embodiment causes the target image subjected to the geometric correction to be displayed in the display region by controlling the display of the image using the display device, as described above.

The information processing device according to the embodiment performs, as the process related to the information processing method according to the embodiment, for example, "the process (the image processing) of the foregoing (1)," "the process (the image processing) of the foregoing (1) and the process (the display region setting process) of the foregoing (2)," "the process (the image processing) of the foregoing (1) and the process (the display control process) of the foregoing (3)," or "the process (the image processing) of the foregoing (1), the process (the display region setting process) of the foregoing (2), and the process (the display control process) of the foregoing (3)."

In addition, "the process (the image processing) of the foregoing (1)," "the process (the image processing) of the foregoing (1) and the process (the display region setting process) of the foregoing (2)," "the process (the image processing) of the foregoing (1) and the process (the display control process) of the foregoing (3)," and "the process (the image processing) of the foregoing (1), the process (the display region setting process) of the foregoing (2), and the process (the display control process) of the foregoing (3)" are separate processes in the process related to the information processing method according to the embodiment, for convenience. Accordingly, in the process related to the information processing method according to the embodiment, for example, each of "the process (the image processing) of the foregoing (1) and the process (the display region setting process) of the foregoing (2)," "the process (the image processing) of the foregoing (1) and the process (the display control process) of the foregoing (3)," and "the process (the image processing) of the foregoing (1), the process (the display region setting process) of the foregoing (2), and the process (the display control process) of the foregoing (3)" can be comprehended as one process. Moreover, in the process related to the information processing method according to the embodiment, for example, each of "the process (the image processing) of the foregoing (1)," "the process (the image processing) of the foregoing (1) and the process (the display region setting process) of the foregoing (2)," "the process (the image processing) of the foregoing (1) and the process (the display control process) of the foregoing (3)," and "the process (the image processing) of the foregoing (1), the process (the display region setting process) of the foregoing (2), and the process (the display control process) of the foregoing (3)" can be comprehended as two or more processes (in accordance with any separation method).

[3] Specific Example of Process Related to Information Process Method According to Embodiment Next, a specific example of the process related to the information processing method according to the above-described embodiment will be described.

Figure 25:
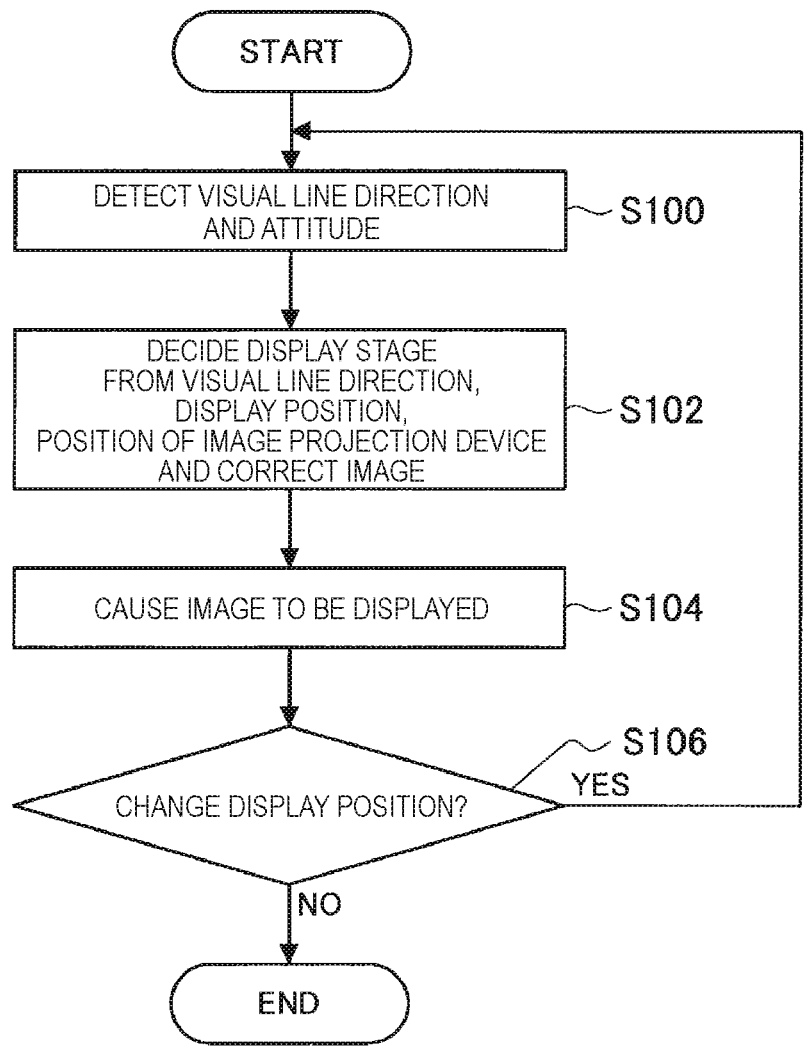
FIG. 25 is a flowchart illustrating an example of a process related to the information processing method according to the embodiment.

[3-1] First Example of Process Related to Information Processing Method According to Embodiment FIG. 25 is a flowchart illustrating an example of a process related to the information processing method according to the embodiment. FIG. 25 illustrates an example of the process related to the information processing method performed for one user in a space of a display environment. Here, in FIG. 25, for example, a process of step SS102 corresponds to an example of the process (the image processing) of the foregoing (1) and a process of step S104 corresponds to an example of the process (the display control process) of the foregoing (3). Moreover, in FIG. 25, for example, a process of S106 corresponds to an example of the process (the display region setting process) of the foregoing (2).

The information processing device according to the embodiment detects a visual line direction and an attitude of a user on the basis of the direction information (S100).

The information processing device according to the embodiment decides a display stage (for example, the display stage illustrated in FIG. 11) on the basis of the visual line direction detected on the basis of the direction information, the position (the display position) of the set display region, and the position of the image projection device in the space of the display environment and performs the geometric correction on the target image (S102). For example, the information processing device according to the embodiment performs one geometric correction among the geometric correction of stage 1 described in the foregoing (A) to the geometric correction of stage 4 described in the foregoing (D).

The information processing device according to the embodiment causes the target image subjected to the geometric correction to be displayed in the display region (S104).

The information processing device according to the embodiment determines whether to change the position of the display region (S106). Here, for example, the information processing device according to the embodiment sets the display region on the basis of the direction information and determines to change the position of the display region in a case in which the set display region is different from a current display region (an example of a case in which the display region setting process related to the second example described in the foregoing (2-2) is performed). In addition, for example, the information processing device according to the embodiment may perform the control described in the foregoing (a) to (c) and subsequently determine whether to change the position in the display region.

In a case in which it is determined in step S106 to change the position of the display region, the information processing device according to the embodiment repeats the processes from step S100.

Conversely, in a case in which it is not determined in step S106 to change the position of the display region, the information processing device according to the embodiment ends the process illustrated in FIG. 25.

The information processing device according to the embodiment performs, for example, the process illustrated in FIG. 25 as the process related to the information processing method according to the embodiment for one user in the space of the display environment.

In addition, the process related to the information processing method according to the embodiment for one user in the space of the display environment is not limited to the example illustrated in FIG. 25.

For example, in a case in which a user manipulation of designating content of the geometric correction is detected, the information processing device according to the embodiment can perform the geometric correction corresponding to the user manipulation on the target image and can cause the image subjected to the geometric correction in response to the user manipulation to be displayed in the display region.

Moreover, for example, one or both of the process of step S104 and the process of step S106 illustrated in FIG. 25 may be performed in an external device of the information processing device according to the embodiment.

Figure 26:
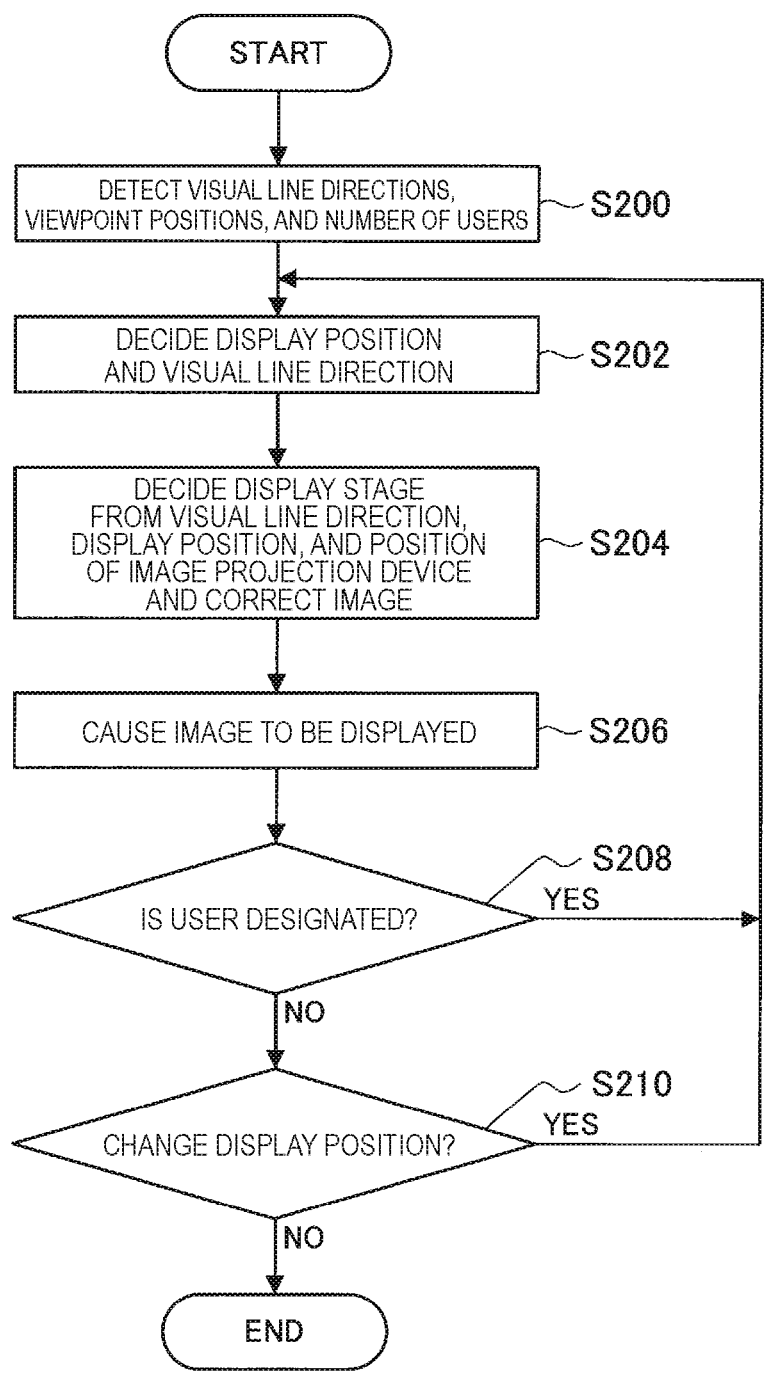
FIG. 26 is a flowchart illustrating another example of the process related to the information processing method according to the embodiment.

[3-2] Second Example of Process Related to Information Processing Method According to Embodiment FIG. 26 is a flowchart illustrating another example of the process related to the information processing method according to the embodiment. FIG. 26 illustrates an example of the process related to the information processing method performed for a plurality of users in the space of the display environment. Here, in FIG. 26, for example, processes of steps S202 and S210 correspond to an example of the process (the display region setting process) of the foregoing (2). Moreover, in FIG. 26, for example, a process of step S204 corresponds to an example of the process (the image processing) of the foregoing (1) and a process of step S206 corresponds to an example of the process (the display control process) of the foregoing (3).

The information processing device according to the embodiment detects the visual line directions of the users, the viewpoint positions of the users, and the number of users on the basis of pieces of the direction information corresponding to the respective users (S200).

The information processing device according to the embodiment decides the display region and one visual line direction (S202). The information processing device according to the embodiment decides the display region, for example, by performing the display region setting process related to the third example described in the foregoing (2-3) to set the display region. Moreover, for example, the information processing device according to the embodiment decides an average vector of vectors corresponding to the visual line directions of the respective users as one visual line direction.

The information processing device according to the embodiment decides the display stage (for example, the display stage illustrated in FIG. 11) on the basis of the decided one visual line direction, the position (the display position) of the display region, and the position of the image projection device in the space of the display environment and performs the geometric correction on the target image (S204).

The information processing device according to the embodiment causes the target image subjected to the geometric correction to be displayed in the display region (S206).

The information processing device according to the embodiment determines whether the user is designated (S208). For example, in a case in which a user manipulation related to designation of the user, such as a manipulation performed on a captured image or a gesture manipulation such as a gesture of a specific user pointing another user, is detected, the information processing device according to the embodiment determines that the user is designated.

In a case in which it is determined in step S206 that the user is designated, the processes from step S202 are performed on the basis of the direction information regarding the user in accordance with a designation result of the user.

Conversely, in a case in which it is not determined in step S206 that the user is designated, the information processing device according to the embodiment determines whether to change the position of the display region, as in step S106 of FIG. 25 (S210).

In a case in which it is determined in step S210 to change the position of the display region, the information processing device according to the embodiment repeats the processes from step S202.

Conversely, in a case in which it is not determined in step S210 to change the position of the display region, the information processing device according to the embodiment ends the process illustrated in FIG. 26.

The information processing device according to the embodiment performs, for example, the process illustrated in FIG. 26 as the process related to the information processing method according to the embodiment for the plurality of users in the space of the display environment.

In addition, the process related to the information processing method according to the embodiment for the plurality of users in the space of the display environment is not limited to the example illustrated in FIG. 26.

For example, in a case in which a user manipulation of designating content of the geometric correction is detected, the information processing device according to the embodiment can perform the geometric correction corresponding to the user manipulation on the target image and can cause an image subjected to the geometric correction corresponding to the user manipulation to be displayed in the display region.

Moreover, for example, one or two or more of the process of step S200, the process of step S202, the process of step S206, the process of step S208, and the process of step S210 illustrated in FIG. 26 may be performed in an external device of the information processing device according to the embodiment.

[4] Example of Effects Obtained by Performing Process Related to Information Processing Method According to Embodiment By performing the process related to the information processing method according to the embodiment, it is possible to obtain, for example, the following effects. In addition, it is regardless to say that the effects obtained by performing the process related to the information processing method according to the embodiment are not limited to the following examples.

- The user can view an image with a favorite attitude when the user views the image since the user can select the display region or the technique for the geometric correction stage by stage.
- It is possible to realize a system capable of displaying an image in a display region corresponding to the direction of the user even in a case in which, for example, the user turns over and the direction of the user is changed. Accordingly, the user does not have to view an image at the same attitude and can view the image in accordance with the direction of the user such as the visual line direction of the user.
- Since it is possible to automatically perform the geometric correction corresponding to the direction of the user and the position of the display region to be set, the user can view an image suitable for a user state with respect to the display region.
- Even in a case in which there are a plurality of users in the space of the display environment, the display region can be set in consideration of a field of view of each user. Therefore, for example, an image with good visibility for all the users can be viewed by respective users. Moreover, it is possible to realize a system capable of displaying an image in a display region only for a specific user or displaying an image in a display region so that the image is not be viewed by a specific user.

(Information Processing Device According to Embodiment)

Next, an example of a configuration of the information processing device according to the embodiment capable of performing the process related to the information processing method according to the embodiment described above will be described.

Figure 27:
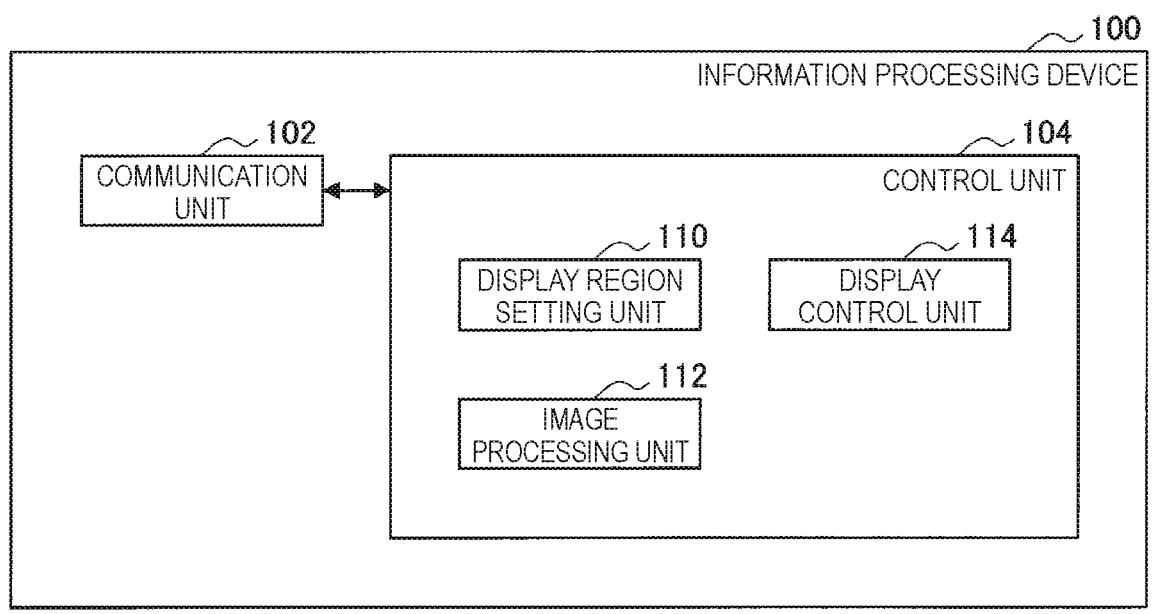
FIG. 27 is a block diagram illustrating an example of a configuration of an information processing device according to the embodiment.

FIG. 27 is a block diagram illustrating an example of a configuration of an information processing device 100 according to the embodiment. The information processing device 100 includes, for example, a communication unit 102 and a control unit 104.

Moreover, for example, the information processing device 100 may include, a read-only memory (ROM which is not illustrated), a random access memory (RAM which is not illustrated), a storage unit (not illustrated), a manipulation unit (not illustrated) which can be manipulated by a user, and a display unit (not illustrated) that displays various screens on a display screen. In the information processing device 100, for example, the constituent elements are connected via a bus serving as a data transmission path.

The ROM (not illustrated) stores a program or control data such as calculation parameters which are used by the control unit 104. The RAM (not illustrated) temporarily stores a program or the like which is executed by the control unit 104.

The storage unit (not illustrated) is storage means included in the information processing device 100 and stores, for example, data related to the information processing method according to the embodiment, such as a table in which a location is associated with a display position and various kinds of data such as various applications. Here, as the storage unit (not illustrated), for example, a magnetic recording medium such as a hard disk and a nonvolatile memory such as a flash memory can be exemplified. Moreover, the storage unit (not illustrated) may be detachably mounted on the information processing device 100.

As the manipulation unit (not illustrated), a manipulation input device to be described below can be exemplified. Moreover, as the display unit (not illustrated), a display device to be described below can be exemplified.

Example of Hardware Configuration of Information Processing Device 100

Figure 28:
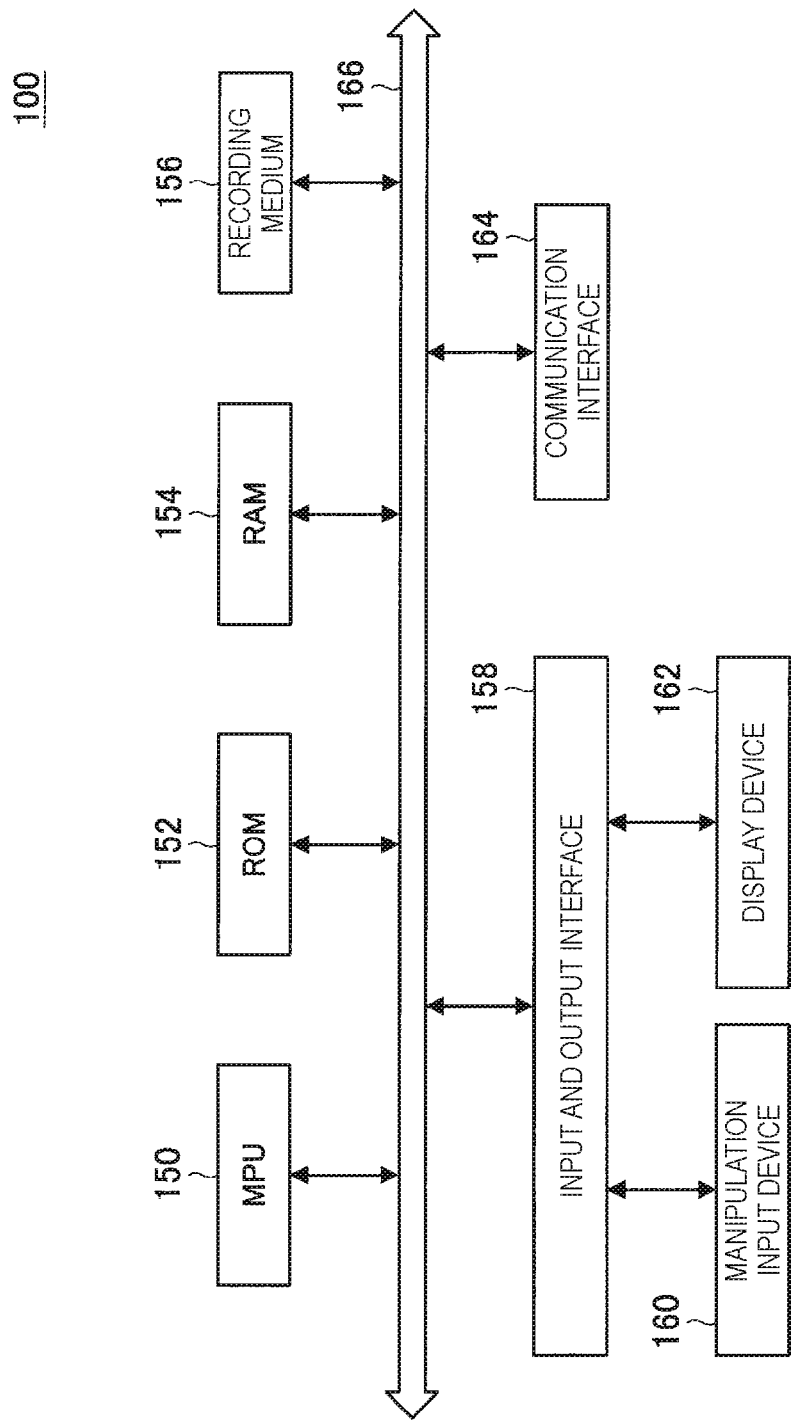
FIG. 28 is an explanatory diagram illustrating an example of a hardware configuration of the information processing device according to the embodiment.

FIG. 28 is an explanatory diagram illustrating an example of a hardware configuration of the information processing device 100 according to the embodiment. The information processing device 100 includes, for example, an MPU 150, a ROM 152, a RAM 154, a recording medium 156, an input and output interface 158, a manipulation input device 160, a display device 162, and a communication interface 164. Moreover, in the information processing device 100, for example, the constituent elements are connected via a bus 166 serving as a data transmission path.

For example, the MPU 150 includes one or two or more processors or various processing circuits including a calculation circuit such as an MPU, and functions as the control unit 104 controlling the entire information processing device 100. Moreover, the MPU 150 plays roles of, for example, the display region setting unit 110, the image processing unit 112, and the display control unit 114 to be described below in the information processing device 100. In addition, one or two or more of the display region setting unit 110, the image processing unit 112, and the display control unit 114 may include a dedicated (or general-purpose) circuit (for example, a processor different from the MPU 150) capable of realizing a process of each unit.

The ROM 152 stores a program or control data such as calculation parameters which is used by the MPU 150. For example, the RAM 154 temporarily stores a program or the like which is executed by the MPU 150.

The recording medium 156 functions as a storage unit (not illustrated) and stores, for example, data related to the information processing method according to the embodiment, such as a table in which a location is associated with a display position and various kinds of data such as various applications. Here, as the recording medium 156, for example, a magnetic recording medium such as a hard disk and a nonvolatile memory such as a flash memory can be exemplified. Moreover, the recording medium 156 may be detachably mounted on the information processing device 100.

The input and output interface 158 connects, for example, the manipulation input device 160 or the display device 162. The manipulation input device 160 functions as a manipulation unit (not illustrated) and the display device 162 functions as a display unit (not illustrated). Here, as the input and output interface 158, for example, a Universal Serial Bus (USB) terminal, a Digital Visual Interface (DVI) terminal, a High-Definition Multimedia Interface (HDMI) (registered trademark) terminal, and various processing circuits can be exemplified.

Moreover, for example, the manipulation input device 160 can be installed on the information processing device 100 and is connected to the input and output interface 158 inside the information processing device 100. As the manipulation input device 160, for example, a button, an arrow key, a rotary selector such as a jog dial, or a combination thereof can be exemplified.

Moreover, for example, the display device 162 can be installed on the information processing device 100 and is connected to the input and output interface 158 inside the information processing device 100. As the display device 162, for example, a liquid crystal display or an organic electro-luminescence display (or also referred to as an organic light emitting diode display) can be exemplified.

In addition, it is regardless to say that the input and output interface 158 can be connected to an external device such as an external manipulation input device (for example, a keyboard or a mouse) or an external display device of the information processing device 100. Moreover, the display device 162 may be, for example, a device in which display and a user manipulation are possible, such as a touch panel.

The communication interface 164 is communication means included in the information processing device 100 and functions as the communication unit 102 that performs wireless or wired communication with an imaging device, a sensor sensing a space of a display environment such as a depth sensor, an external device such as an image projection device, or an external device such as a server via a network (or directly). Here, as the communication interface 164, for example, a communication antenna and a radio frequency (RF) circuit (for wireless communication), an IEEE 802.15.1 port and a transmission and reception circuit (for wireless communication), an IEEE 802.11 port and a transmission and reception circuit (for wireless communication), or a Local Area Network (LAN) terminal and a transmission and reception circuit (for wired communication) can be exemplified.

The information processing device 100 that has, for example, the configuration illustrated in FIG. 28 performs the process related to the information processing method according to the embodiment. In addition, a hardware configuration of the information processing device 100 according to the embodiment is not limited to the configuration illustrated in FIG. 28.

For example, the information processing device 100 does not have to include the communication interface 164 in a case in which communication with an external device is performed via a connected external communication device or a case in which a process is performed in a standalone mode. Moreover, the communication interface 164 may be capable of performing communication with one or two or more external devices in conformity with a plurality of communication schemes.

Moreover, for example, the information processing device 100 does not have to include the recording medium 156, the manipulation input device 160, or the display device 162.

Moreover, the information processing device 100 may include an imaging device or a sensor capable of sensing a space of a display environment such as a depth sensor, for example. Moreover, the information processing device 100 may include, for example, an image projection device.

Moreover, a part or the whole of the structural elements illustrated in FIG. 28 (or a configuration according to a modification example) may be realized by one or two or more ICs.

Referring back to FIG. 27, an example of the configuration of the information processing device 100 will be described. The communication unit 102 is communication means included in the information processing device 100 and performs wireless or wired communication with an imaging device, a sensor sensing a space of a display environment such as a depth sensor, an external device such as an image projection device, or an external device such as a server, via a network (or directly). Moreover, the communication of the communication unit 102 is controlled by, for example, the control unit 104.

Here, as the communication unit 102, for example, a communication antenna and an RF circuit or a LAN terminal and a transmission and reception circuit can be exemplified. However, the configuration of the communication unit 102 is not limited to the foregoing configuration. For example, the communication unit 102 can have a configuration corresponding to any standard capable of performing communication, such as a USB terminal and a transmission and reception circuit or have any configuration capable of communicating an external device via a network. Moreover, the communication unit 102 may have a configuration capable of performing communication with one or two or more external devices in conformity with a plurality of communication schemes.

The control unit 104 is implemented by, for example, an MPU and plays a role in controlling the entire information processing device 100. Moreover, the control unit 104 includes, for example, a display region setting unit 110, an image processing unit 112, and a display control unit 114 and plays a role in leading the process related to the information processing method according to the embodiment. Moreover, for example, the control unit 104 can also play a role of an acquisition unit (not illustrated) that acquires the direction information by generating the directional information or controls the communication unit 102 or the like to acquire the direction information from an external device.

The display region setting unit 110 plays a role in leading the process (the display region setting process) of the foregoing (2) and sets the display region. For example, the display region setting unit 110 sets the display region by performing one process among the display region setting process related to the first example described in the foregoing (2-1) to the display region setting process related to the third example described in the foregoing (2-3).

The image processing unit 112 plays a role in leading the process (the image processing) of the foregoing (1).

For example, the image processing unit 112 performs the geometric correction on the target image instructed to be displayed in the display region on the basis of the direction information. For example, the image processing unit 112 can perform the geometric correction corresponding to the direction of the user indicated by the direction information by changing the content of the geometric correction to be performed on the target image, as described in the foregoing (I) to (III).

Moreover, for example, the image processing unit 112 can also perform the geometric correction corresponding to the target image by changing the content of the geometric correction to be performed on the target image, as described in the foregoing (IV).

Moreover, for example, in a case in a user manipulation of designating the content of the geometric correction is detected, the image processing unit 112 can also perform the geometric correction corresponding to the user manipulation on the target image instructed to be displayed in the display region.

Moreover, for example, the image processing unit 112 may perform one or two or more of the process described in the foregoing (1-4-1) to the process described in the foregoing (1-4-3).

The display control unit 114 plays a role in leading the process (the display control process) of the foregoing (3) and causes the target image subjected to the geometric correction to be displayed in the display region.

For example, the display control unit 114 causes the target image subjected to the geometric correction to be displayed in the display region by causing the communication unit 102 or an external communication device connected to the information processing device 100 to transmit control data including a control command and image data indicating the target image subjected to the geometric correction to a device related to display of the image in the display region, such as an image projection device or a display device. Moreover, in a case in which the image projection device is mounted on a device that has a pan tilt mechanism such as platform, the display control unit 114 may further causes control data including a control command to be transmitted to the device that includes the pan tilt mechanism.

For example, the control unit 104 includes the display region setting unit 110, the image processing unit 112, and the display control unit 114 and leads the process related to the information processing method according to the embodiment (for example, the process (the image processing) of the foregoing (1), the process (the display region setting process) of the foregoing (2), and the process (the display control process) of the foregoing (3)).

The information processing device 100 that has, for example, the configuration illustrated in FIG. 27 performs the process related to the information processing method according to the embodiment (for example, the process (the image processing) of the foregoing (1), the process (the display region setting process) of the foregoing (2), and the process (the display control process) of the foregoing (3)).

Accordingly, the information processing device 100 that has, for example, the configuration illustrated in FIG. 27 can correct the image to be displayed in the display region in accordance with a user state with respect to the display region.

Moreover, the information processing device 100 that has, for example, the configuration illustrated in FIG. 27 can achieve the effects by performing the process related to the information processing method according to the embodiment described above.

In addition, the configuration of the information processing device according to the embodiment is not limited to the configuration illustrated in FIG. 27.

For example, the information processing device according to the embodiment may have a configuration in which one or both of the display region setting unit 110 and the display control unit 114 illustrated in FIG. 27 are not included.

Even in a case in which the information processing device has the configuration in which one or both of the display region setting unit 110 and the display control unit 114 illustrated in FIG. 27 are not included, the information processing device according to the embodiment can perform the process (the image processing) of the foregoing (1). Accordingly, even in a case in which the information processing device has the configuration in which one or both of the display region setting unit 110 and the display control unit 114 illustrated in FIG. 27 are not included, the information processing device according to the embodiment can correct an image to be displayed in the display region in accordance with a user state with respect to the display region.

Moreover, the information processing device according to the embodiment can include one or two or more of the display region setting unit 110, the image processing unit 112, and the display control unit 114 illustrated in FIG. 27 (which is realized with, for example, another processing circuit) separately from the control unit 104.

Moreover, as described above, "the process (the image processing) of the foregoing (1)," "the process (the image processing) of the foregoing (1) and the process (the display region setting process) of the foregoing (2)," "the process (the image processing) of the foregoing (1) and the process (the display control process) of the foregoing (3)," and "the process (the image processing) of the foregoing (1), the process (the display region setting process) of the foregoing (2), and the process (the display control process) of the foregoing (3)" are separate processes in the process related to the information processing method according to the embodiment, for convenience. Accordingly, a configuration for realizing the process related to the information processing method according to the embodiment is not limited to the configuration illustrated in FIG. 27. A configuration appropriate for a separation method of the process related to the information processing method according to the embodiment can be taken.

Moreover, for example, in a case in which communication with an external device is performed via an external communication device that has similar function and configuration to the communication unit 102 or a case in which a process is performed in a standalone mode, the information processing device according to the embodiment does not have to include the communication unit 102.

The information processing device has been described above as the embodiment, but the embodiment is not limited thereto. For example, the embodiment can be applied to various devices capable of performing the process related to the information processing method according to the embodiment, such as a computer such as a personal computer (PC) or a server, an image projection device such as a projector, a display device such as a display device installed at any location (for example, a wall, a floor, or a ceiling) in a space of a display environment, or a communication device such as a mobile phone or a smartphone. Moreover, for example, the embodiment can also be applied to a processing IC which can be embedded in the above-described device.

Moreover, the information processing device according to the embodiment may be applied to, for example, a system including a plurality of devices on the assumption that the devices are connected to a network (or communicate with each device) such as cloud computing. That is, the information processing device according to the embodiment described above can also be realized as, for example, an information processing system that performs the process related to the information processing method according to the embodiment by using a plurality of devices. As an example of the information processing system that performs the process related to the information processing method according to the embodiment by using the plurality of devices, for example, a system in which the process (the image processing) of the foregoing (1), the process (the display region setting process) of the foregoing (2), and the process (the display control process) of the foregoing (3) are performed in cooperation in the plurality of devices included in the information processing system can be exemplified.

(Program According to Embodiment)

By causing a processor in a computer to execute a program (for example, a program capable of executing the process related to the information processing method according to the embodiment, such as "the process (the image processing) of the foregoing (1)," "the process (the image processing) of the foregoing (1) and the process (the display region setting process) of the foregoing (2)," "the process (the image processing) of the foregoing (1) and the process (the display control process) of the foregoing (3)," and "the process (the image processing) of the foregoing (1), the process (the display region setting process) of the foregoing (2), and the process (the display control process) of the foregoing (3)") for causing a computer to function as the information processing device according to the embodiment, it is possible to correct an image to be displayed in the display region in accordance with a user state with respect to the display region.

Moreover, when a program that causes a computer to function as the information processing device according to the present embodiment is executed by a processor or the like in the computer, it is possible to provide an effect provided by the processing related to the information processing method according to the present embodiment described above.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

For example, it has been illustrated above that a program (computer program) that causes a computer to function as the information processing device according to the present embodiment is provided, but the present embodiment can further provide a recording medium in which the above-described program is stored together.

The above-described configurations express examples of the present embodiment and, of course, pertain to the technical scope of the present disclosure.

Note that the effects described above are not necessarily limitative. With or in the place of the above effects, there may be achieved any one of the effects described in this specification or other effects that may be grasped from this specification.

Additionally, the present technology may also be configured as below.

(1)
An information processing device including:
an image processing unit configured to perform geometric correction on a target image instructed to be displayed in a display region capable of displaying an image, on a basis of direction information indicating a direction of a user viewing the display region with respect to the display region.

(2)
The information processing device according to (1),
in which the image processing unit rotates the target image around a predetermined axis as the geometric correction to be performed on the target image, and
a shape of the display region is changed by rotating the target image.

(3)
The information processing device according to (1),
in which the image processing unit performs the geometric correction in a first mode in which the geometric correction is performed to rotate the target image so that an image displayed in the display region is tilted in the direction of the user indicated by the direction information, or performs the geometric correction in a second mode in which the geometric correction of the first mode is not performed.

(4)
The information processing device according to (3),
in which the image processing unit switches between the first mode and second mode on a basis of the target image.

(5)
The information processing device according to (3) or (4),
in which the image processing unit switches between the first mode and second mode on a basis of a state of the user viewing the display region.

(6)
The information processing device according to (5),
in which the state of the user is a number of users viewing the display region.

(7)
The information processing device according to (5),
in which the state of the user is a relation between the direction of the user indicated by the direction information and the display region.

(8)
The information processing device according to (1),
in which the image processing unit changes content of the geometric correction to be performed on the target image, in accordance with a relation between the direction of the user indicated by the direction information and the display region.

(9)
The information processing device according to (8),
in which the image processing unit changes the content of the geometric correction to be performed on the target image, between a case in which the relation between the direction of the user and the display region is a first relation in which the direction of the user and the display region are determined to meet at right angles and a case in which the relation between the direction of the user and the display region is a second relation different from the first relation.

(10)
The information processing device according to (9),
in which the image processing unit does not performs geometric correction on the target image, further on a basis of the target image in a case in which the relation between the direction of the user and the display region is the first relation.

(11)
The information processing device according to any one of (1) and (8) to (10),
in which, in a case in which the image is displayed in the display region by projecting the image from an image projection device to the display region, the image processing unit changes content of the geometric correction to be performed on the target image, on a basis of the direction of the user indicated by the direction information and a projection direction of the image from the image projection device to the display region.

(12)
The information processing device according to (11),
in which the image processing unit changes the content of the geometric correction to be performed on the target image, between a case in which a relation between the direction of the user and the projection direction is a third relation in which the direction of the user and the projection direction are determined to be parallel to each other and a case in which the relation between the direction of the user and the projection direction is a fourth relation different from the third relation.

(13)
The information processing device according to any one of (1) to (12),
in which, in a case in which the display region is a plurality of planes, the image processing unit performs the geometric correction on each portion of the target image to be displayed in each of the planes included in the display region.

(14) The information processing device according to any one of (1) to (13),
in which, in a case in which a user manipulation of designating content of the geometric correction is detected, the image processing unit performs the geometric correction corresponding to the user manipulation on the target image instructed to be displayed in the display region.

(15) The information processing device according to any one of (1) to (14),
in which the geometric correction to be performed on the target image includes a process of performing no geometric correction on the target image.

(16) The information processing device according to any one of (1) to (15),
in which, in a case in which a piece of the direction information regarding each of a plurality of users is acquired, the image processing unit decides a direction of one of the users on a basis of the respective directions of the plurality of users indicated by a plurality of pieces of the direction information, and performs the geometric correction on the target image instructed to be displayed in the display region on a basis of the decided direction of the user.

(17) The information processing device according to any one of (1) to (16),
in which the direction information indicates a visual line direction of the user.

(18) The information processing device according to any one of (1) to (17), further including:
a display control unit configured to cause the target image subjected to the geometric correction to be displayed in the display region.

(19) An information processing method to be performed by an information processing device, the information processing method including:
a step of performing geometric correction on a target image instructed to be displayed in a display region capable of displaying an image, on a basis of direction information indicating a direction of a user viewing the display region with respect to the display region.

(20) A program causing a computer to execute:
a step of performing geometric correction on a target image instructed to be displayed in a display region capable of displaying an image, on a basis of direction information indicating a direction of a user viewing the display region with respect to the display region.

REFERENCE SIGNS LIST 100 information processing device
102 communication unit
104 control unit
110 display region setting unit
112 image processing unit
114 display control unit

The invention claimed is:

1. An information processing device, comprising:
at least one processor configured to:
control an image projection device to project a target image on a display region, wherein a position of the image projection device is different from a position of the display region;
execute geometric correction on the target image in the display region, wherein
the geometric correction is executed based on direction information indicating a user visual line direction with respect to the display region,
the display region is user viewable,
the geometric correction includes rotation of the target image around an axis on a surface of the display region, and
the target image is rotated on the surface of the display region by an angle calculated based on the user visual line direction; and
change content of the geometric correction based on a third relation between the user visual line direction and a projection direction of the target image, and a fourth relation between the user visual line direction and the projection direction of the target image, wherein
the projection direction of the target image is from the image projection device to the display region,
the user visual line direction is parallel to the projection direction in the third relation, and
the fourth relation is different from the third relation.

2. The information processing device according to claim 1, wherein the at least one processor is further configured to change a shape of the display region based on the rotation of the target image.

3. The information processing device according to claim 1, wherein
the at least one processor is further configured to execute the geometric correction in one of a first mode or a second mode,
in the first mode the geometric correction includes the rotation of the target image so that the target image in the display region is tilted in the user visual line direction indicated by the direction information, and
in the second mode the geometric correction of the first mode is not executed.

4. The information processing device according to claim 3, wherein the at least one processor is further configured to switch between the first mode and the second mode based on the target image.

5. The information processing device according to claim 3, wherein
the user visual line direction is of a user who views the display region, and
the at least one processor is further configured to switch between the first mode and the second mode based on a user state of the user who views the display region.

6. The information processing device according to claim 5, wherein the user state corresponds to a number of users who view the display region.

7. The information processing device according to claim 5, wherein the user state is a relation between the user visual line direction indicated by the direction information and the display region.

8. The information processing device according to claim 1, wherein the at least one processor is further configured to change the content of the geometric correction based on a relation between the user visual line direction indicated by the direction information and the display region.

9. The information processing device according to claim 8, wherein
the at least one processor is further configured to change the content of the geometric correction based on a first relation between the user visual line direction and the display region, and a second relation between the user visual line direction and the display region,
the user visual line direction and the display region are determined to meet at right angles in the first relation, and
the second relation is different from the first relation.

10. The information processing device according to claim 9, wherein the at least one processor is further configured to not execute the geometric correction on the target image based on the first relation between the user visual line direction and the display region.

11. The information processing device according to claim 1, wherein
the display region includes a plurality of planes, and
the at least one processor is further configured to execute the geometric correction on each portion of the target image displayed in each plane of the plurality of planes in the display region.

12. The information processing device according to claim 1, wherein, in a case in which a user manipulation of designating content of the geometric correction is detected, the at least one processor is further configured to execute the geometric correction based on the user manipulation on the target image.

13. The information processing device according to claim 1, wherein the geometric correction includes a process to execute no geometric correction on the target image.

14. The information processing device according to claim 1, wherein
the at least one processor is further configured to:
acquire the direction information associated with each user of a plurality of users;
determine a visual line direction of one user of the plurality of users based on the direction information associated with the one user of the plurality of users; and
execute the geometric correction on the target image based on the determined visual line direction of the one user of the plurality of users.

15. The information processing device according to claim 1, the at least one processor is further configured to control display of the target image subjected to the geometric correction in the display region.

16. An information processing method, comprising:
in an information processing device:
controlling an image projection device to project a target image on a display region, wherein a position of the image projection device is different from a position of the display region;
executing geometric correction on the target image in the display region, wherein
the geometric correction is executed based on direction information indicating a user visual line direction with respect to the display region,
the display region is user viewable,
the geometric correction includes at rotation of the target image around an axis on a surface of the display region, and
the target image is rotated on the surface of the display region by an angle calculated based on the user visual line direction; and
changing content of the geometric correction based on a third relation between the user visual line direction and a projection direction of the target image, and a fourth relation between the user visual line direction and the projection direction of the target image, wherein
the projection direction of the target image is from the image projection device to the display region,
the user visual line direction is parallel to the projection direction in the third relation, and
the fourth relation is different from the third relation.

17. A non-transitory computer-readable medium having stored thereon computer-executable instructions which, when executed by an information processing device, cause the information processing device to execute operations, the operations comprising:
controlling an image projection device to project a target image on a display region, wherein a position of the image projection device is different from a position of the display region;
executing geometric correction on the target image in the display region, wherein
the geometric correction is executed based on direction information indicating a user visual line direction with respect to the display region,
the display region is user viewable,
the geometric correction includes rotation of the target image around an axis on a surface of the display region, and
the target image is rotated on the surface of the display region by an angle calculated based on the user visual line direction; and
changing content of the geometric correction based on a third relation between the user visual line direction and a projection direction of the target image, and a fourth relation between the user visual line direction and the projection direction of the target image, wherein
the projection direction of the target image is from the image projection device to the display region,
the user visual line direction is parallel to the projection direction in the third relation, and
the fourth relation is different from the third relation.

18. The information processing device according to claim 1, wherein the at least one processor is further configured to:
calculate the angle between the user visual line direction and an upper direction of the target image; and
rotate the target image on the surface of the display region by the calculated angle.

* * * * *